United States Patent [19]
Nakayama et al.

[11] Patent Number: 5,078,481
[45] Date of Patent: Jan. 7, 1992

[54] MAGNIFICATION CHANGING LENS

[75] Inventors: Hiroki Nakayama, Kawasaki; Keiji Ikemori, Yokohama, both of Japan

[73] Assignee: Canon Kabushiki Kaisha, Tokyo, Japan

[21] Appl. No.: 575,659

[22] Filed: Aug. 31, 1990

[30] Foreign Application Priority Data

Sep. 5, 1989 [JP] Japan ................................. 1-230157
Feb. 17, 1990 [JP] Japan ................................. 2-37065
Mar. 15, 1990 [JP] Japan ................................. 2-65484

[51] Int. Cl.$^5$ ............................................. G02B 15/00
[52] U.S. Cl. ........................... 359/680; 359/686; 359/676
[58] Field of Search ................. 350/429, 423, 426, 427

[56] References Cited

U.S. PATENT DOCUMENTS

| | | | |
|---|---|---|---|
| 3,771,853 | 11/1973 | Nakamura | 350/426 |
| 4,591,235 | 5/1986 | Tokumaru et al. | 350/426 |
| 4,653,873 | 3/1987 | Kawamura | 350/426 |
| 4,846,562 | 7/1989 | Tokumaru et al. | 350/426 |

*Primary Examiner*—Bruce Y. Arnold
*Assistant Examiner*—Hung Xuan Dang
*Attorney, Agent, or Firm*—Fitzpatrick, Cella, Harper & Scinto

[57] ABSTRACT

This specification discloses a magnification changing lens which has, in succession from the object side, a first lens unit of negative refractive power, a second lens unit of positive refractive power, a third lens unit of negative refractive power and a fourth lens unit of positive or negative refractive power and in which at least the second and third lens unit are moved toward the object side to thereby accomplish the magnification change from the wide angle end to the telephoto end. This magnification changing lens particularly satisfies the following condition:

$$0.13 < bf\text{-min}/fw < 0.7,$$

where bf·min is the shortest distance of the back focus in the whole magnification change range and fw is the focal length of the entire system at the wide angle end.

28 Claims, 20 Drawing Sheets

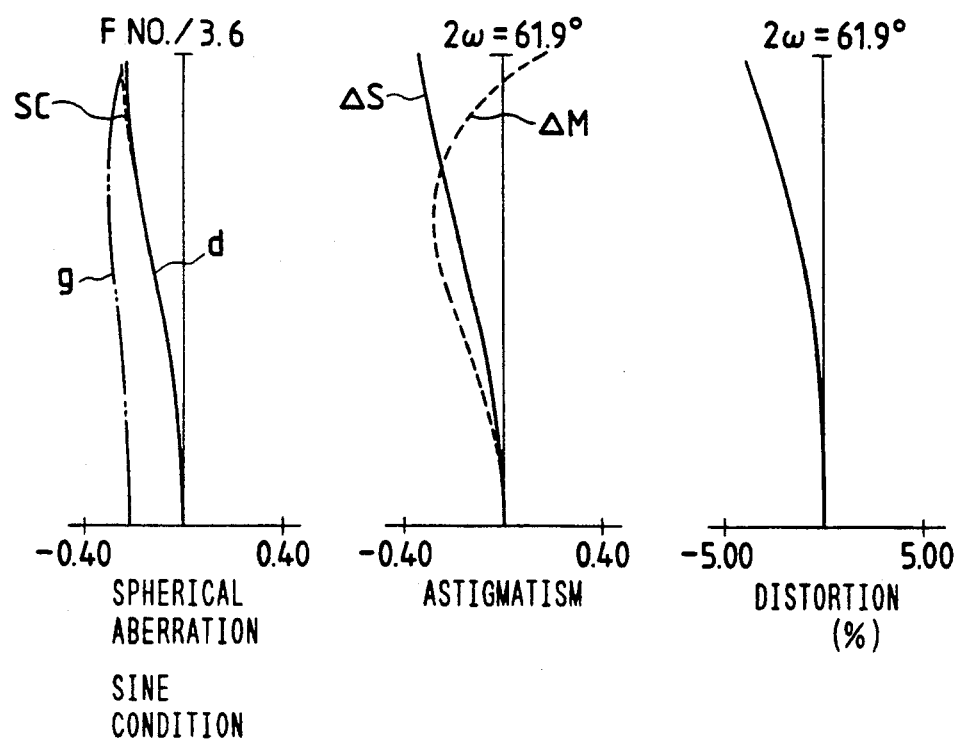
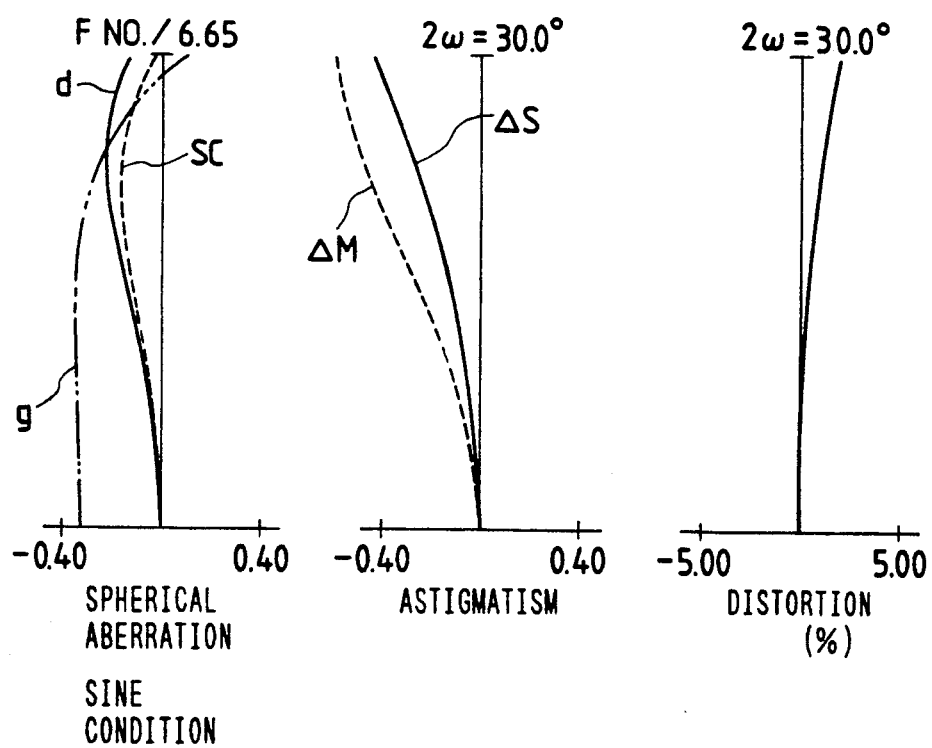

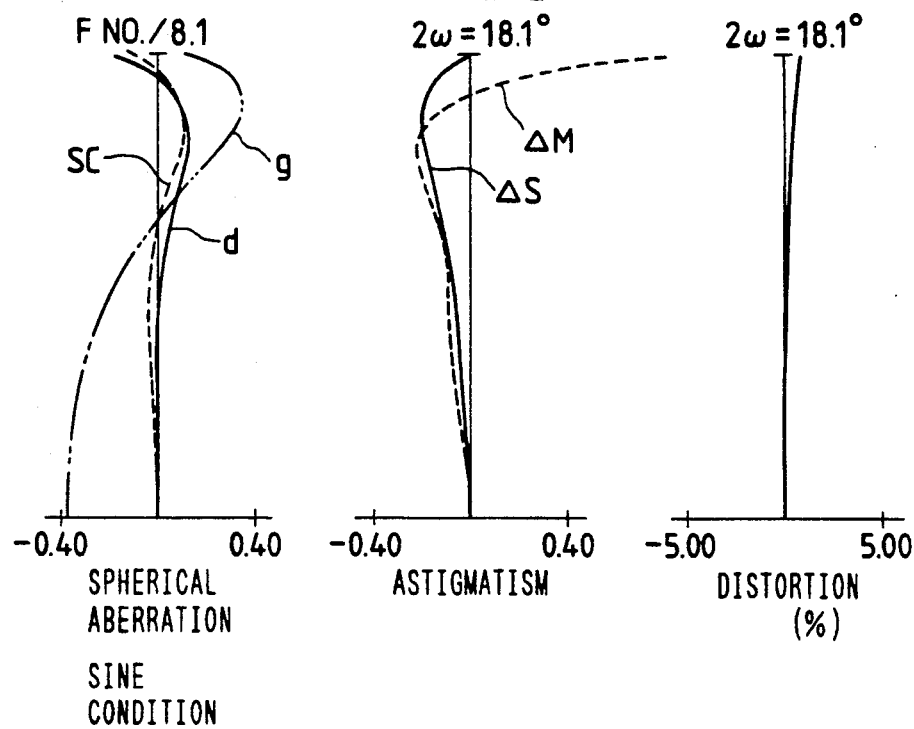
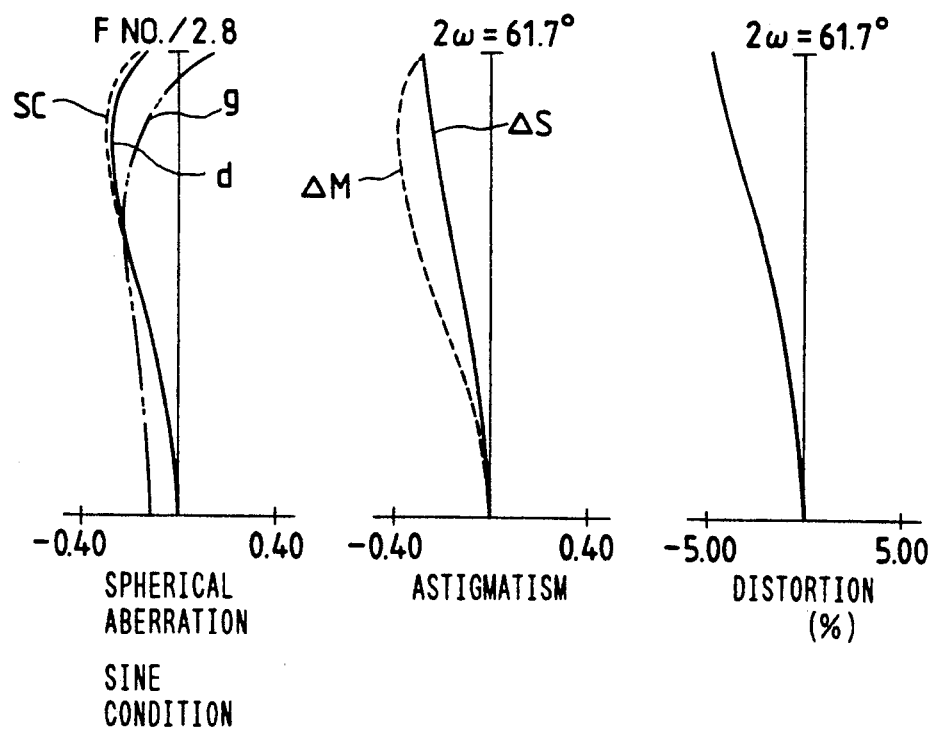

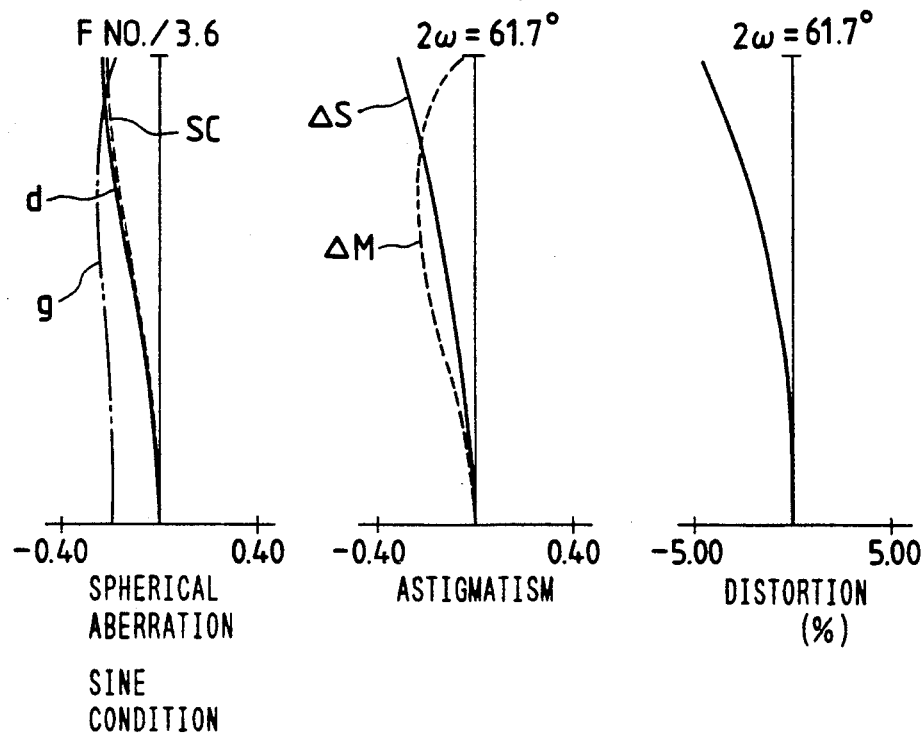
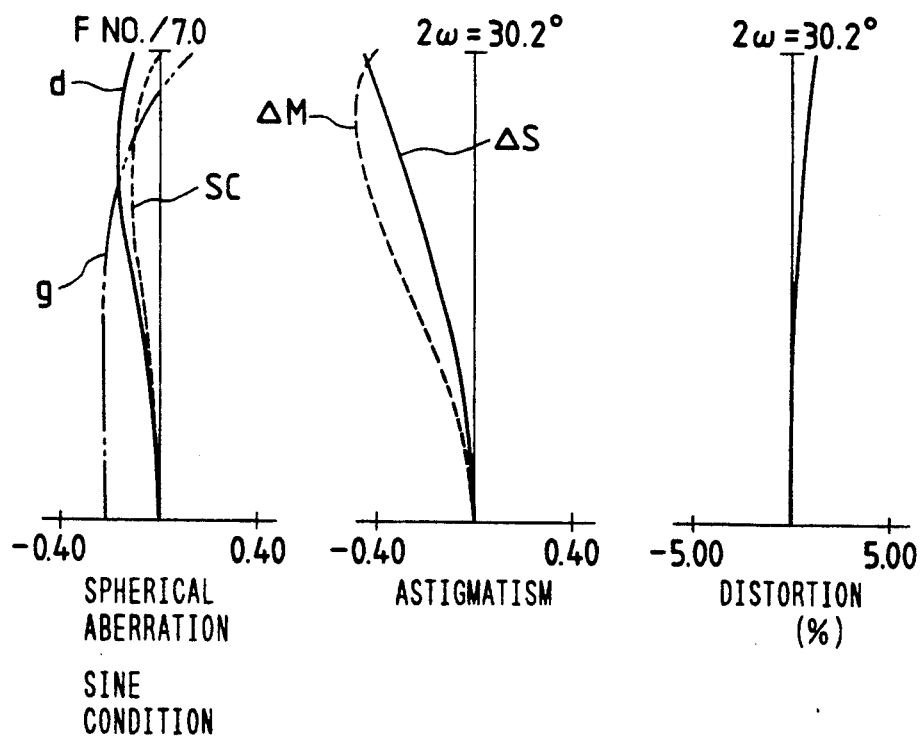

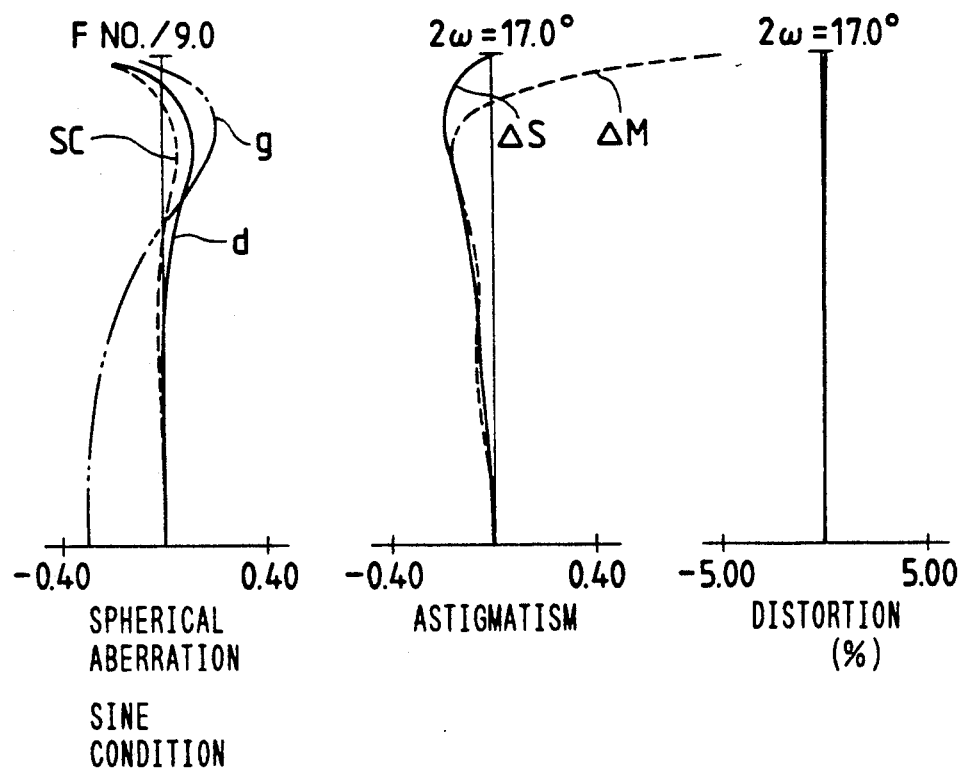

MAGNIFICATION CHANGING LENS

BACKGROUND OF THE INVENTION

1. Field of the Invention

This invention relates to a compact zoom lens suitable for a lens shutter camera, a video camera or the like, and particularly to a compact zoom lens having four lens units as a whole in which the back focal length is shortened and the full lens length (the distance from a first lens surface to the imaging plane) is shortened.

2. Related Background Art

Recently, in lens shutter cameras, video cameras or the like, compact zoom lenses having a short full lens length have been required with the tendency of the cameras toward compactness. Among these, a relatively compact zoom lens including the standard field angle (having a focal length of the order of 50 mm as calculated in terms of a 35 mm still camera for a field angle $2\omega = 47°$) has been proposed by the applicant, for example, in Japanese Laid-Open Patent Application No. 63-271214 and Japanese Laid-Open Patent Application No. 64-72114.

These publications disclose a so-called three-unit zoom lens of a magnification change ratio of the order of 2 to 3 which has, in succession from the object side, a first unit of negative refractive power, a second unit of positive refractive power and a third unit of negative refractive power and in which these three lens units are moved toward the object side under predetermined conditions, whereby a magnification change from the wide angle end to the telephoto end is effected.

Generally in a zoom lens, if the refractive power of each lens unit is strengthened, the amount of movement of each lens unit for obtaining a predetermined magnification change ratio will become smaller and it will become possible to shorten the full lens length. However, if the refractive power of each lens unit is simply strengthened, it will lead to the problem that aberration fluctuation resulting from a magnification change becomes greater and it becomes difficult to obtain a good optical performance over the whole magnification change range particularly when a high magnification change of a magnification change ratio of 3 or higher is contrived.

On the other hand, zoom lenses of wide angle which are suitable as interchangeable lenses for a single-lens reflex camera and in which a lens of negative refractive power precedes have been proposed, for example, in Japanese Patent Publication No. 49-23912, Japanese Laid-Open Patent Application No. 58-95315 and Japanese Laid-Open Patent Application No. 2-63909, but these zoom lenses have been long in back focal length and considerably long in the full optical length.

SUMMARY OF THE INVENTION

It is a first object of the present invention to further develop the zoom lens of short full length and short back focal length proposed by the applicant in the aforementioned Japanese Laid-Open Patent Application No. 63-271214 and Japanese Laid-Open Patent Application No. 64-72114 and to provide a magnification changing lens which is comprised of four lens units as a whole and in which the movement conditions of each lens unit and the lens construction of each lens unit are set appropriately and which is shortened in the full lens length and yet have a magnification change ratio of 3 – 5.5.

It is a second object of the present invention to provide a magnification changing lens having a high optical performance over the whole magnification change range.

BRIEF DESCRIPTION OF THE DRAWINGS

FIGS. 5A to 7C show the various aberrations in numerical value embodiments 1-3 of the present invention.

In the cross-sectional views of the lenses, I, II, III and IV indicate a first unit, a second unit, a third unit and a fourth unit, respectively, the arrows indicate the directions of movement of the respective lens units in the magnification change from the wide angle end to the telephoto end, (A) shows the wide angle end, and (B) shows the telephoto end. In the aberration graphs, (A), (B) and (C) show the aberrations at the wide angle end, the middle and the telephoto end, respectively, d indicates d-line, g indicates g-line, SC indicates the sine condition, $\Delta S$ indicates the sagittal imaging plane, and $\Delta M$ indicates the meridional imaging plane.

DESCRIPTION OF THE PREFERRED EMBODIMENTS

The zoom lens of the present invention is characterized in that it has four lens units, i.e., in succession from the object side, a first unit of negative refractive power, a second unit of positive refractive power, a third unit of negative refractive power and a fourth unit of positive refractive power, and the magnification change from the wide angle end to the telephoto end is accomplished by the second and third units being moved toward the object side and each element is set so that during the magnification change from the wide angle end to the telephoto end, the paraxial lateral magnification of the fourth unit may always be possible.

Figure 1:
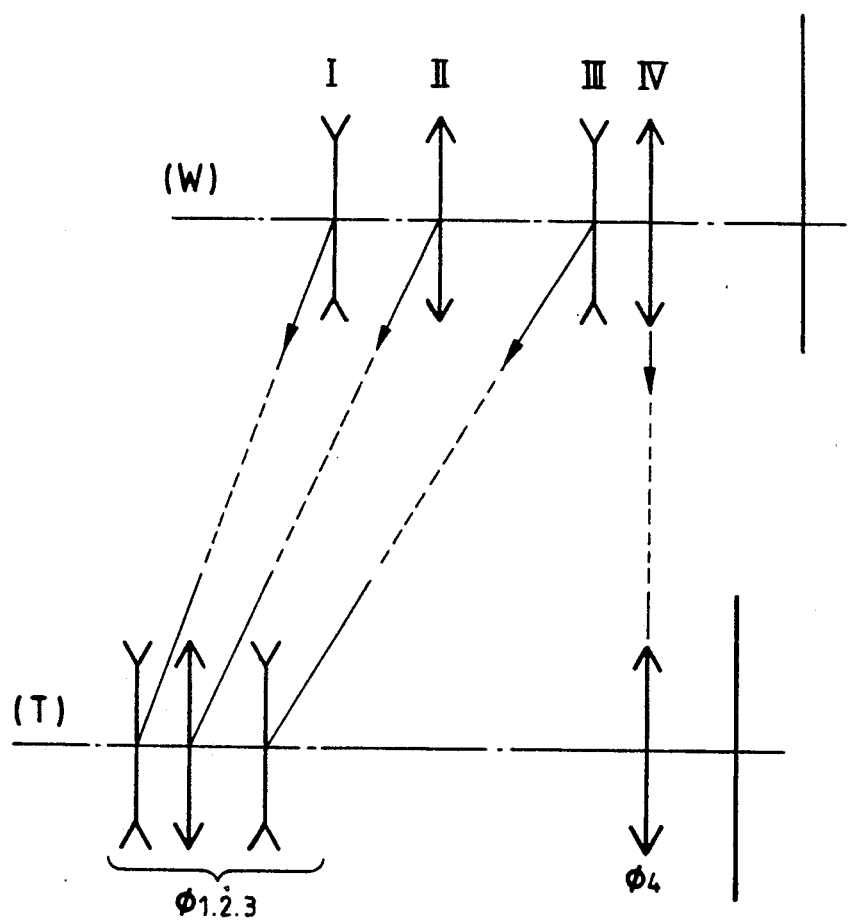
FIG. 1 is an illustration of the paraxial refractive power arrangement of the zoom lens of the present invention.
Figure 2A:
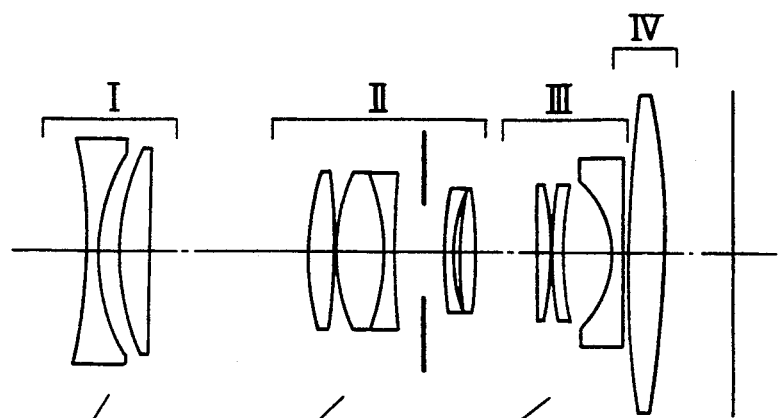
FIGS. 2A to 4C are cross-sectional views of the lenses of numerical value embodiments 1-3 of the present invention.
Figure 2B:
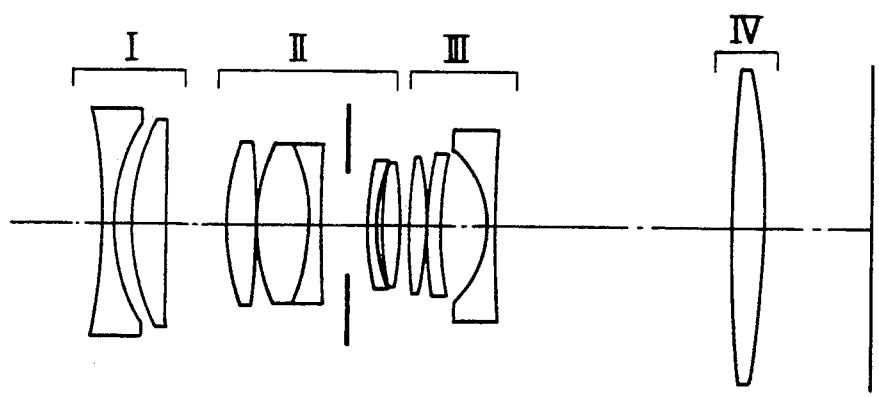
Figure 2C:
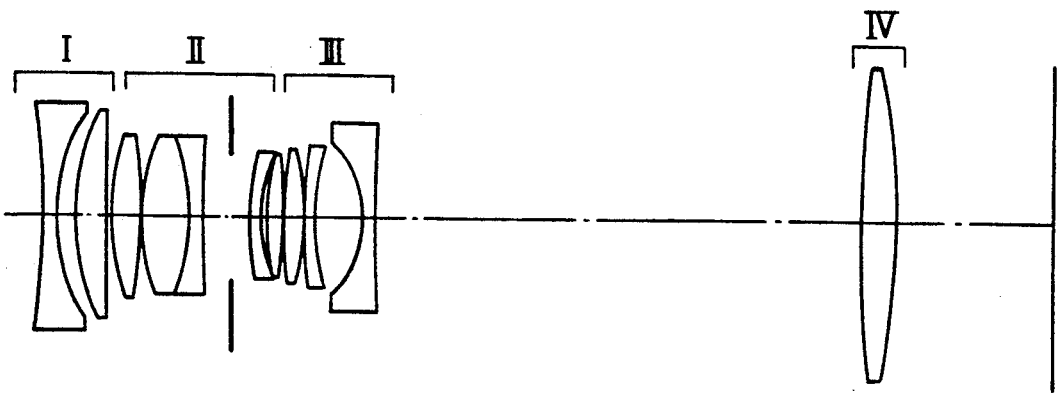
Figure 3A:
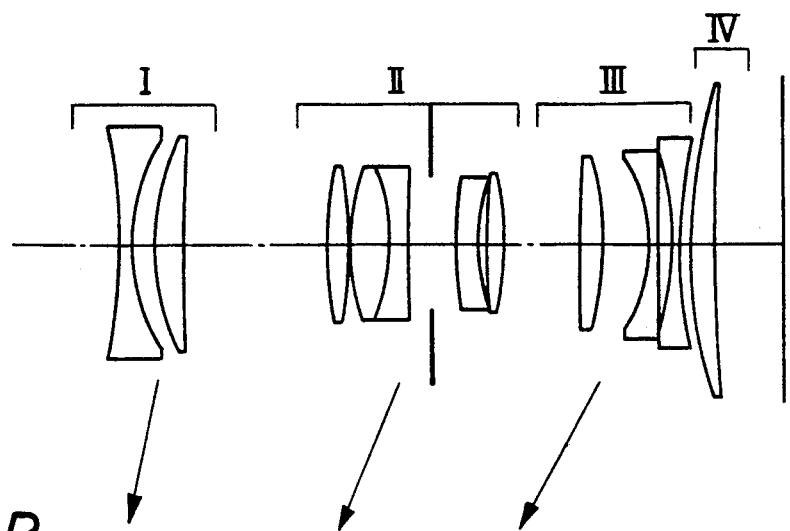
Figure 3B:
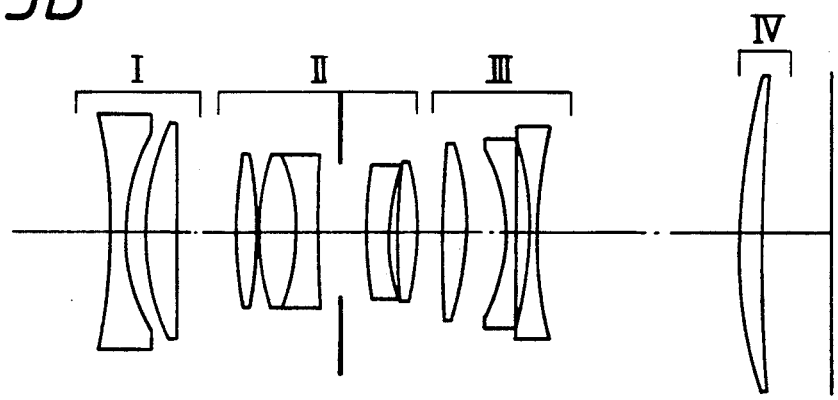
Figure 3C:
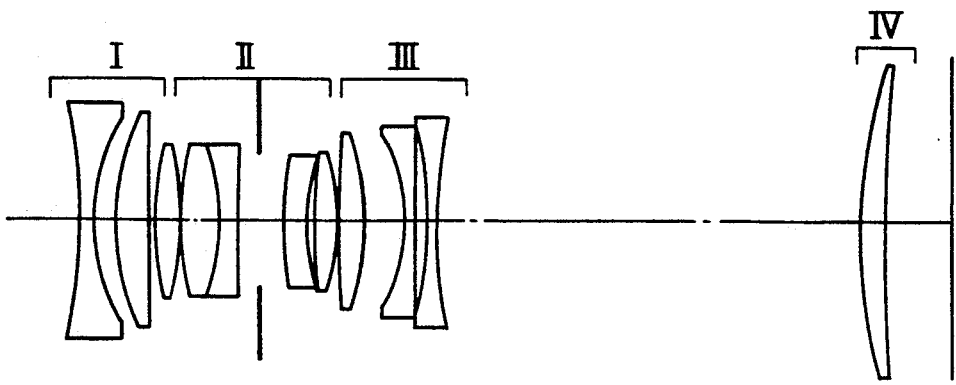
Figure 4A:
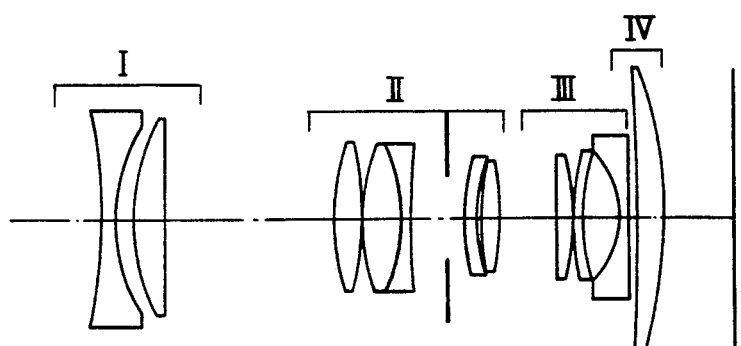
Figure 4B:
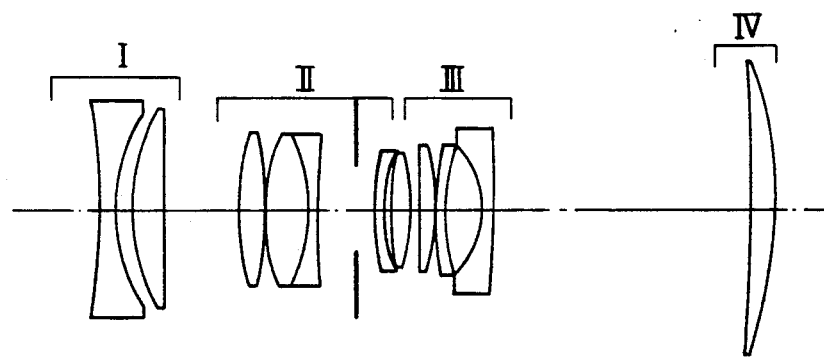
Figure 4C:
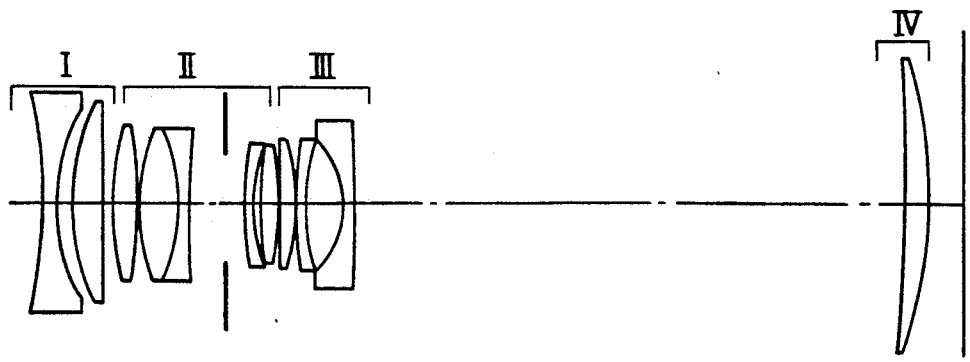
Figure 6B:
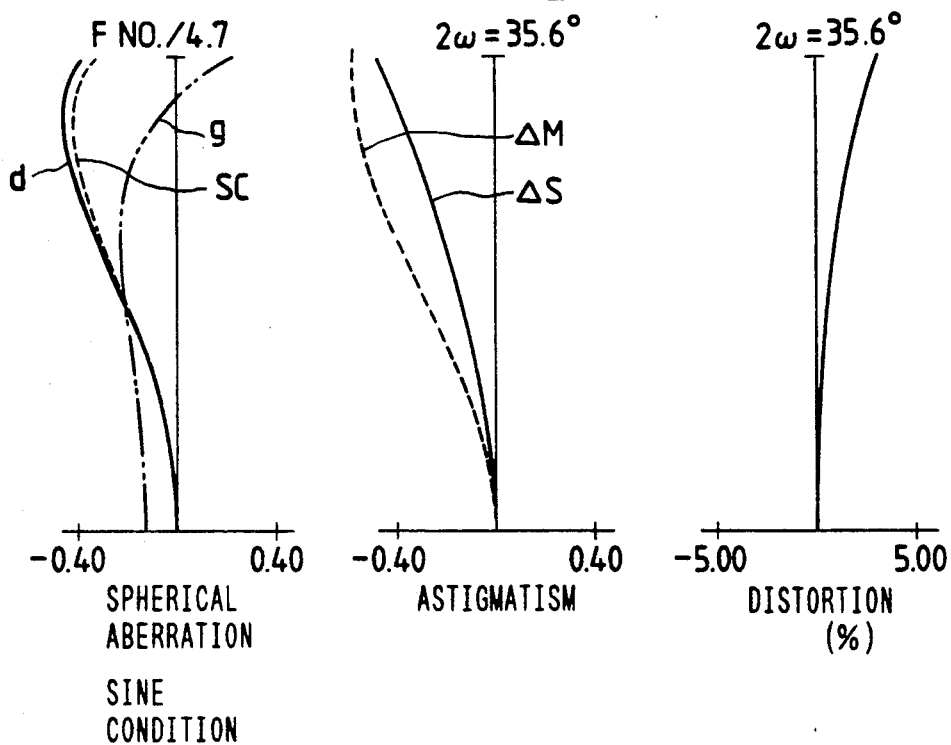
Figure 6C:
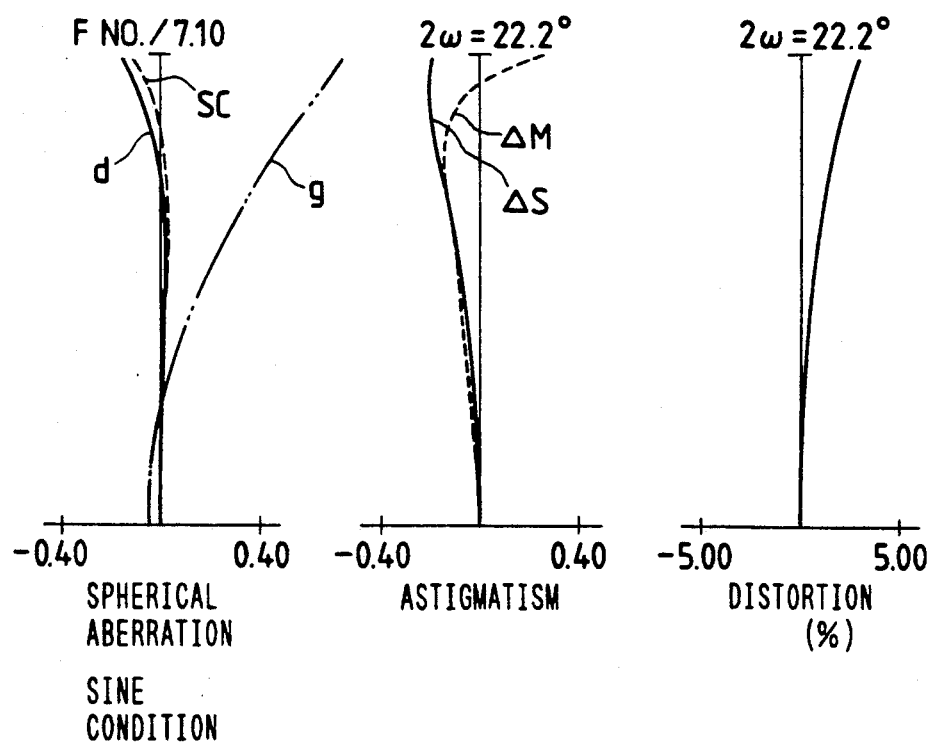

FIG. 1 is a schematic view showing the paraxial refractive power arrangement of the zoom lens of the present invention. In FIG. 1, (W) indicates the zoom position at the wide angle end, and (T) indicates the zoom position at the telephoto end.

FIGS. 2A to 4C are cross-sectional views of the lenses of numerical value embodiments 1-3 of the present invention.

In these figures, I designates a first unit of negative refractive power, II denotes a second unit of positive refractive power, III designates a third unit of negative refractive power, and IV denotes a fourth unit. The arrows indicate the directions of movement of the respective lens units when a magnification change is effected from the wide angle end to the telephoto end. The fourth lens unit may be positive or negative, and here, it has a positive refractive power, but an embodiment having a negative refractive power will also be described later.

In the zoom lens according to the present embodiment, when a magnification change is to be effected from the wide angle end to the telephoto end, at least the second unit and the third lens are moved toward the object side independently of each other as shown in the figures.

Each element is set so that during the magnification change from the wide angle end to the telephoto end, the paraxial lateral magnification of the fourth unit may always be positive. Thereby it is made easy to achieve a zoom lens having a magnification change ratio as high as 3-4 and moreover having a high optical performance over the whole magnification change range.

Also, in the present invention, in order to contrive the compactness of the entire lens system and yet obtain a predetermined magnification change ratio easily, the amounts of movement M3 and M4 of the third unit and the fourth unit, respectively, resulting from the magnification change from the wide angle end to the telephoto end and set so as to satisfy the following condition:

$$-1 < M4/M3 < 0.8 \ldots \quad (1)$$

Thereby a predetermined magnification change ratio is obtained easily and the optical performance is maintained good over the whole magnification change range and yet the back focal length at the wide angle end is shortened and also the full lens length at the wide angle end is greatly shortened.

The technical significance of the condition (1) will now be described.

In the so-called four-unit zoom lens of the present invention comprising four lens units, when the combined refractive power of a forward lens unit comprising the first, second and third units is $\phi_{123}$ and the refractive power of the fourth unit is $\phi_4$, the refractive power $\phi$ of the entire system is $$\phi = \phi_{123} + \phi_4 - e\phi_{123} \cdot \phi_4 \ldots \quad (2)$$

where e is the principal point spacing from the rearward principal point of the forward lens unit to the forward principal point of the fourth unit.

In the zoom lens according to the present embodiment, the combined refractive power $\phi_{123}$ is a positive value and becomes smaller during the magnification change from the wide angle end to the telephoto end. Also, the refractive power $\phi_4$ is a fixed positive value. Thus, in order that during the magnification change, the combined refractive power $\phi$ may become still smaller, that is, still a higher magnification change ratio may be obtained, the value of the principal point spacing e can become greater during the magnification change from the wide angle end to the telephoto end.

So, in the present embodiment, design is made such that when the fourth unit is moved relative to the third unit so that the magnification change ratio may be obtained most effectively during the magnification change from the wide angle end to the telephoto end, the movement at this time satisfies the condition (1) to thereby make the variation in the value of the principal point spacing e in the equation (2) great. Thereby, both of the compactness and the high magnification change ratio of the entire lens system are achieved effectively.

That is, by constructing each element so as to satisfy the condition (1), a greater magnification change ratio may be obtained easily than in the threeunit zoom lens shown in the aforementioned Japanese Laid-Open Patent Application No. 63-271214 or Japanese Laid-Open Patent Application No. 64-72114.

Particularly in the present embodiment, even if the fourth unit is fixed (M4=0) during the magnification change, if the condition (1) is satisfied as relative movement, it is possible to obtain a high magnification change ratio and at such time, the mechanism can be simplified.

If the upper limit of the condition (1) is exceeded, the spacing between the third unit and the fourth unit will become smaller on the telephoto side and the entire lens system will become bulky, and if the lower limit of the condition (1) is exceeded, the fourth unit will become too proximate to the imaging plane (the film surface), and this is not good.

Also, in the present invention, to shorten the full lens length and yet obtain a high optical performance over the whole magnification change range while securing a predetermined magnification change ratio, it is preferable that the following condition be satisfied:

$$0.8 < |f3/f2| < 1.4 \ldots \quad (3)$$

where f2 and f3 are the focal lengths of the second unit and the third unit, respectively.

If the upper limit of the condition (3) is exceeded, the refractive power of the third unit which contributes most to magnification change will become too weak and to obtain a predetermined magnification change ratio, the amount of movement of the third unit will have to be made great and thus, the entire lens system will become bulky, and this is not suitable. Or the refractive power of the second unit will become too strong and Petzval sum will become great in the positive direction and particularly, the imaging plane characteristic in the zoom intermediate portion will fall down to under, and this is not suitable. Also, if the lower limit of the condition (3) is exceeded, particularly the refractive power of the second unit will become too weak and it will become necessary to make the movable portion which is necessary for magnification change, i.e., the spacing between the second unit and the first unit and the spacing between the second unit and the third unit great and thus, the entire lens system will become bulky, and this is not suitable.

Also, in the present invention, to correct distortion and curvature of image field particularly in the marginal portion of the picture plane well, it is preferable that the following condition be satisfied:

$$1.5 < f4/fw < 7.0 \ldots \quad (4)$$

where f4 is the focal length of the fourth unit, and fw is the focal length of the entire system at the wide angle end.

If the upper limit of the condition (4) is exceeded and the refractive power of the fourth unit becomes weak, the amount of movement of each lens unit will have to be increased to obtain a predetermined magnification change ratio from the equation (2) and thus, the entire lens system will become bulky, and this is not good. If the lower limit of the condition (4) is exceeded and the refractive power of the fourth unit becomes too strong, barrel type (negative) distortion will become great on the wide angle side and Petzval sum will become great in the positive direction, and curvature of image field will become under-corrected particularly at the zoom position in the intermediate portion, and this is not good.

In the present invention, if the aforementioned condition (1) is set to $$-0.2 < M4/M3 < 0.3 \ldots \quad (5)$$

further compactness and still a higher magnification change ratio of the entire lens system can be achieved easily while a high optical performance is maintained, and this is preferable.

Some numerical value embodiments of the present invention will now be shown. In the numerical value embodiments, Ri represents the radius of curvature of the ith lens surface from the object side, Di represents the thickness and air space of the ith lens from the object side, and Ni and Vi represent the refractive index and the Abbe number, respectively, of the glass of the ith lens from the object side.

During the magnification change from the wide angle end to the telephoto end, in numerical value embodiment 1, the fourth unit is moved toward the object side, and in numerical value embodiment 2, the fourth unit is fixed, and in numerical value embodiment 3, the fourth unit is moved toward the imaging plane side.

Moving the fourth unit toward the imaging plane side is the type which contributes most to magnification change, and is preferable in achieving a high magnification change ratio.

In any of numerical value embodiments 1-3, during the magnification change from the wide angle end to the telephoto end, the first unit is moved toward the object side, whereby the shortening of the full lens length at the wide angle end is accomplished effectively. That is, there is adopted such a refractive power arrangement that the full lens length is short on the wide angle side and long on the telephoto side.

Numerical Value Embodiment 1

F = 36~136  FNo = 1:3.6~8.1  2ω = 61.9°~18.1°

| R1 = −86.73 | D1 = 1.75 | N1 = 1.83481 | ν1 = 42.7 |
| R2 = 27.35 | D2 = 2.45 | | |
| R3 = 30.71 | D3 = 4.06 | N2 = 1.74077 | ν2 = 27.8 |
| R4 = 435.93 | D4 = variable | | |
| R5 = 37.35 | D5 = 3.68 | N3 = 1.51633 | ν3 = 64.1 |
| R6 = −82.08 | D6 = 0.20 | | |
| R7 = 26.27 | D7 = 6.47 | N4 = 1.58267 | ν4 = 46.4 |
| R8 = −26.69 | D8 = 1.61 | N5 = 1.84666 | ν5 = 23.9 |
| R9 = 145.91 | D9 = 3.67 | | |
| R10 = stop | D10 = 2.72 | | |
| R11 = 49.89 | D11 = 1.33 | N6 = 1.83400 | ν6 = 37.2 |
| R12 = 22.45 | D12 = 0.56 | | |
| R13 = 35.92 | D13 = 2.26 | N7 = 1.68893 | ν7 = 31.1 |
| R14 = −66.58 | D14 = variable | | |
| R15 = 133.06 | D15 = 2.27 | N8 = 1.58144 | ν8 = 40.8 |
| R16 = −35.97 | D16 = 0.20 | | |
| R17 = 116.48 | D17 = 1.30 | N9 = 1.83400 | ν9 = 37.2 |
| R18 = −36.81 | D18 = 6.38 | | |
| R19 = −13.61 | D19 = 1.50 | N10 = 1.60311 | ν10 = 60.7 |
| R20 = −3844.91 | D20 = variable | | |
| R21 = 163.31 | D21 = 4.83 | N11 = 1.60311 | ν11 = 60.7 |

-continued

Numerical Value Embodiment 1

R22 = −106.34

| Variable spacing | Focal length | | |
|---|---|---|---|
| | W 36.20 | M 80.67 | T 136.00 |
| D4 | 21.30 | 8.47 | 0.98 |
| D14 | 7.91 | 1.59 | 0.31 |
| D20 | 0.57 | 30.65 | 64.74 |

M4/M3 = 0.16
|f3/f2| = 0.94
f4/fw = 2.97

Numerical Value Embodiment 2

F = 36.2~110.0  FNo = 1:2.8~7.1  2ω = 61.7°~22.2°

| R1 = −76.01 | D1 = 1.70 | N1 = 1.77250 | ν1 = 49.6 |
| R2 = 27.71 | D2 = 3.09 | | |
| R3 = 33.47 | D3 = 4.01 | N2 = 1.72825 | ν2 = 28.5 |
| R4 = 398.82 | D4 = variable | | |
| R5 = 48.22 | D5 = 2.86 | N3 = 1.51633 | ν3 = 64.1 |
| R6 = −80.36 | D6 = 0.20 | | |
| R7 = 31.99 | D7 = 5.56 | N4 = 1.57135 | ν4 = 53.0 |
| R8 = −24.90 | D8 = 2.62 | N5 = 1.84666 | ν5 = 23.9 |
| R9 = 439.82 | D9 = 3.00 | | |
| R10 = stop | D10 = 3.18 | | |
| R11 = 59.98 | D11 = 3.03 | N6 = 1.83400 | ν6 = 37.2 |
| R12 = 27.72 | D12 = 0.68 | | |
| R13 = 52.79 | D13 = 2.91 | N7 = 1.69895 | ν7 = 30.1 |
| R14 = −42.04 | D14 = variable | | |
| R15 = 133.61 | D15 = 3.50 | N8 = 1.58144 | ν8 = 40.8 |
| R16 = −38.23 | D16 = 5.74 | | |
| R17 = −23.50 | D17 = 1.20 | N9 = 1.83400 | ν9 = 37.2 |
| R18 = −2030.23 | D18 = 1.32 | | |
| R19 = −57.26 | D19 = 1.50 | N10 = 1.62299 | ν10 = 58.1 |
| R20 = 70.66 | D20 = variable | | |
| R21 = 74.63 | D21 = 2.79 | N11 = 1.60311 | ν11 = 60.7 |
| R22 = 212.84 | | | |

| Variable spacing | Focal Length | | |
|---|---|---|---|
| | W 36.20 | M 67.40 | T 110.00 |
| D4 | 18.34 | 7.74 | 0.99 |
| D14 | 9.84 | 3.17 | 0.50 |
| D20 | 1.14 | 26.10 | 56.20 |

M4/M3 = 0
|f3/f2| = 1.08
f4/fw = 5.22

Numerical Value Embodiment 3

F = 36.2~145.0  FNo = 1:3.6~9.0  2ω = 61.7°~17°

| R1 = −87.43 | D1 = 1.75 | N1 = 1.83481 | ν1 = 42.7 |
| R2 = 27.78 | D2 = 2.71 | | |
| R3 = 31.63 | D3 = 4.44 | N2 = 1.74077 | ν2 = 27.8 |
| R4 = 563.42 | D4 = variable | | |
| R5 = 40.87 | D5 = 3.56 | N3 = 1.51633 | ν3 = 64.1 |
| R6 = −70.62 | D6 = 0.20 | | |
| R7 = 28.08 | D7 = 5.86 | N4 = 1.58267 | ν4 = 46.4 |
| R8 = −28.91 | D8 = 1.63 | N5 = 1.84666 | ν5 = 23.9 |
| R9 = 161.82 | D9 = 5.48 | | |
| R10 = stop | D10 = 2.61 | | |
| R11 = 44.12 | D11 = 1.33 | N6 = 1.83400 | ν6 = 37.2 |
| R12 = 22.60 | D12 = 0.81 | | |
| R13 = 44.10 | D13 = 2.48 | N7 = 1.68893 | ν7 = 31.1 |
| R14 = −65.35 | D14 = variable | | |
| R15 = 512.26 | D15 = 2.28 | N8 = 1.58144 | ν8 = 40.8 |
| R16 = −35.38 | D16 = 0.10 | | |
| R17 = 53.40 | D17 = 1.30 | N9 = 1.83400 | ν9 = 37.2 |
| R18 = 29.51 | D18 = 5.56 | | |
| R19 = −14.70 | D19 = 1.50 | N10 = 1.60311 | ν10 = 60.7 |
| R20 = −409.71 | D20 = variable | | |
| R21 = −499.37 | D21 = 3.75 | N11 = 1.60311 | ν11 = 60.7 |
| R22 = −72.47 | | | |

-continued

Numerical Value Embodiment 3

| Variable spacing | Focal length | | |
|---|---|---|---|
| | W 36.23 | M 80.14 | T 145.03 |
| D4 | 24.48 | 10.90 | 1.75 |
| D14 | 8.65 | 1.76 | 0.41 |
| D20 | 0.70 | 37.46 | 80.05 |

$M4/M3 = -0.07$
$|f3/f2| = 1.0206$
$f4/fw = 3.87$

In the present invention, to correct well introversive coma flare and barrel type negative distortion caused particularly by downward light rays on the wide angle side, an aspherical surface of a shape in which positive refractive power becomes stronger or negative refractive power becomes weaker toward the marginal portion of the lens may preferably be used as at least one lens surface in the first unit.

Also, to correct well barrel type negative distortion on the wide angle side and introversive coma caused by upward light rays on the telephoto side, an aspherical surface of a shape in which positive refractive power becomes weaker or negative refractive power becomes stronger toward the marginal portion of the lens may preferably be used as at least one lens surface in the third unit or the fourth unit.

In the present invention, during magnification change, the lens unit in the second unit may be divided into two lens units which may be moved discretely from each other, and according to this, aberration fluctuation is reduced and still a higher magnification change ratio becomes easy to obtain.

In the present invention, it is preferable in that aberration fluctuation is small to effect focusing by moving the first unit, but alternatively, focusing may be effected by moving the third unit or the fourth unit, or as a further alternative, only a predetermined object distance range may be focused by the third unit or the fourth unit.

Embodiments in which the fourth lens unit is of negative refractive power will now be described with reference to FIGS. 8A to 8C and so on.

I, II and III designate lens units having negative, positive and negative refractive powers, respectively, and IV denotes a fourth lens unit having a negative refractive power. The arrows indicate movement loci for the zooming from the wide angle end to the telephoto end.

Figure 8A:
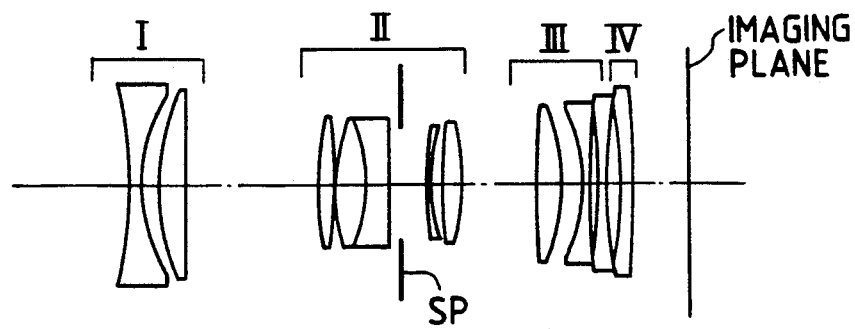
FIGS. 8A to 9C are cross-sectional views of the lenses of numerical value embodiments 4 and 5 of the present invention.
Figure 8B:
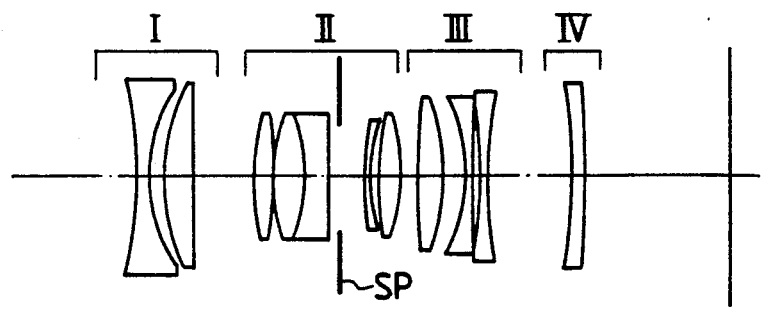
Figure 8C:
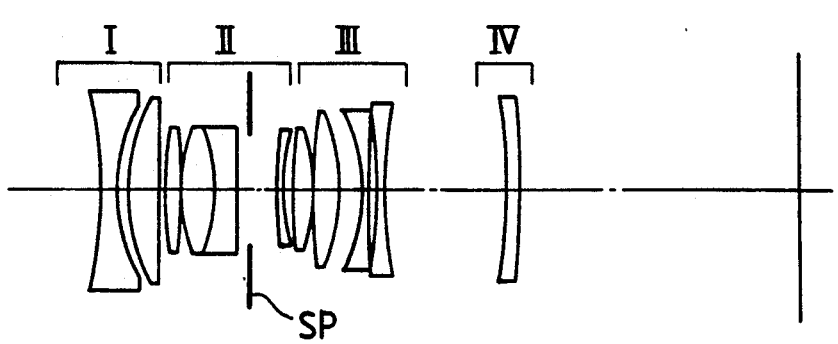
Figure 9A:
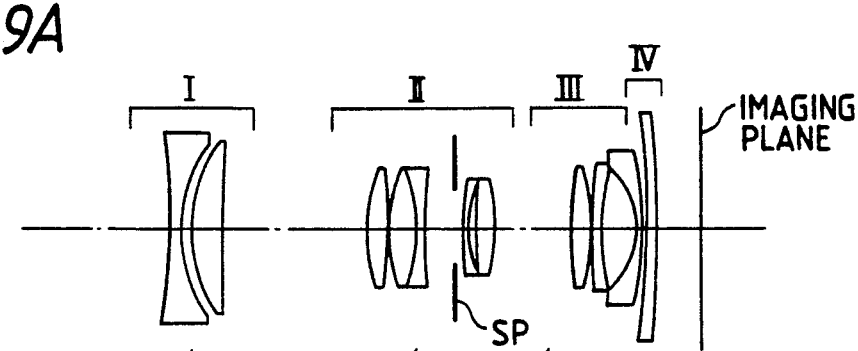
Figure 9B:
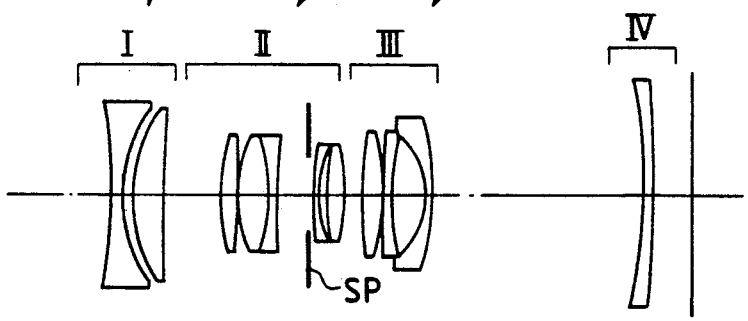
Figure 9C:
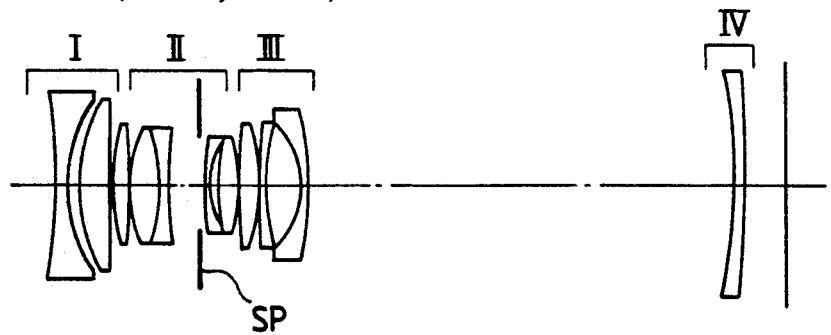
Figure 10A:
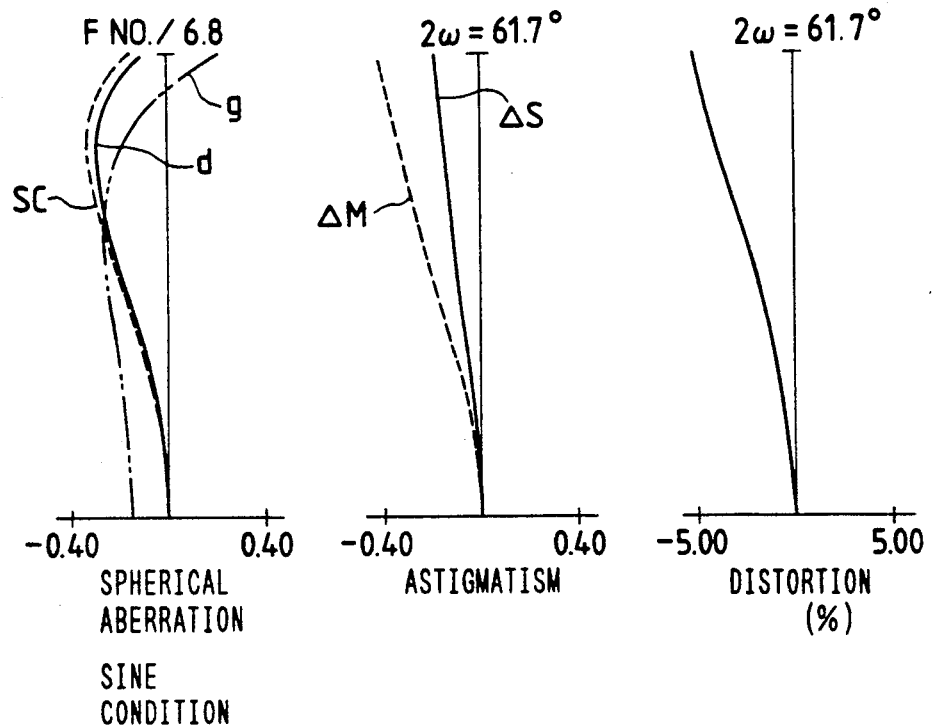
FIGS. 10A to 11C show the various aberrations in numerical value embodiments 4 and 5 of the present invention.
Figure 10B:
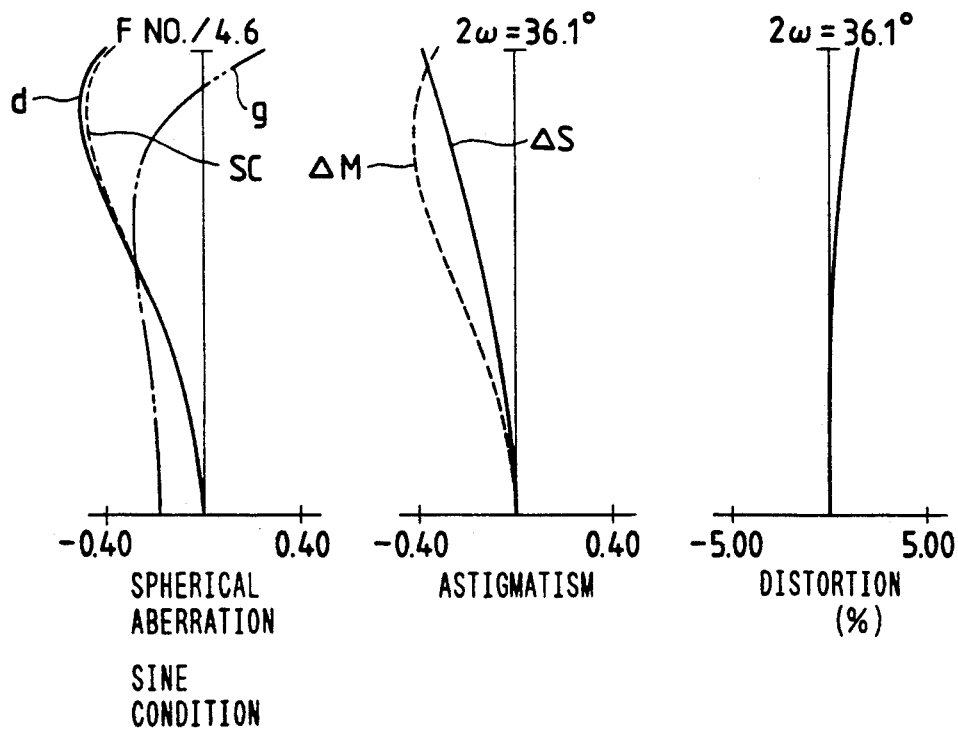
Figure 10C:
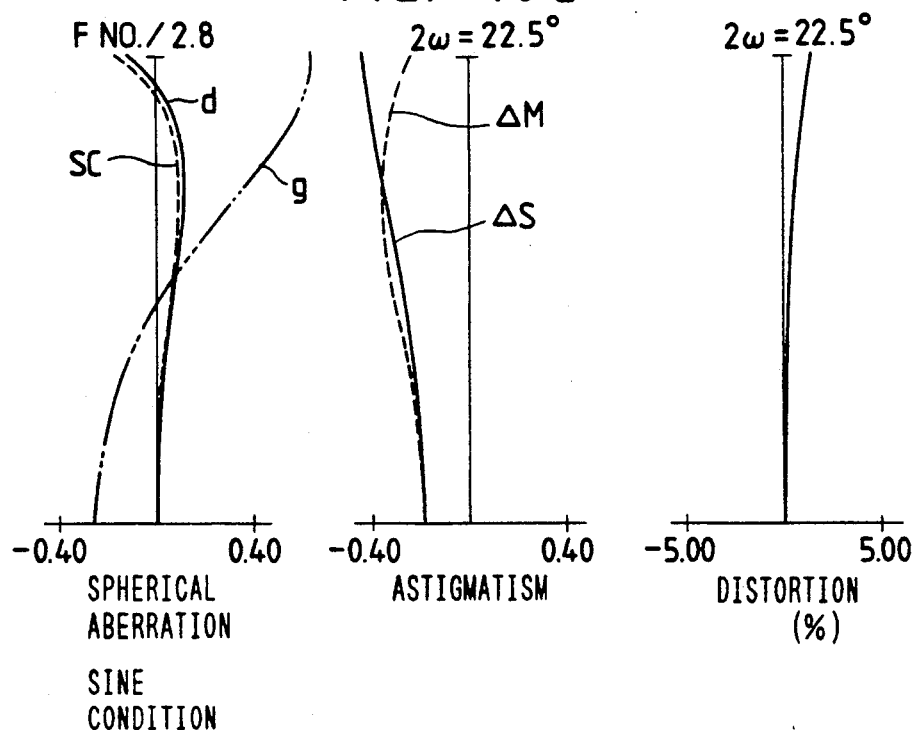
Figure 11A:
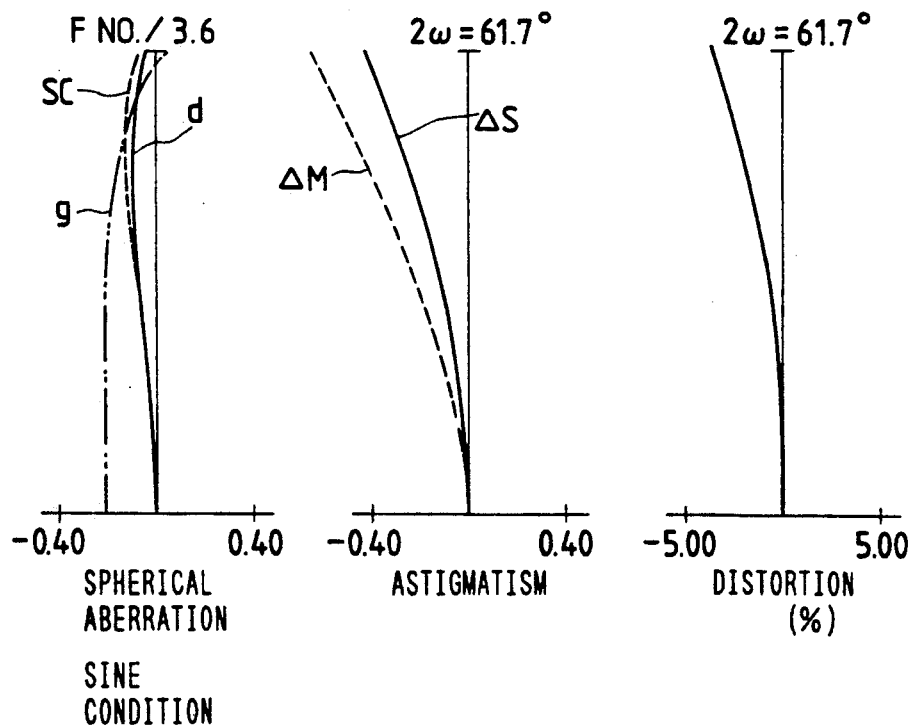
Figure 11B:
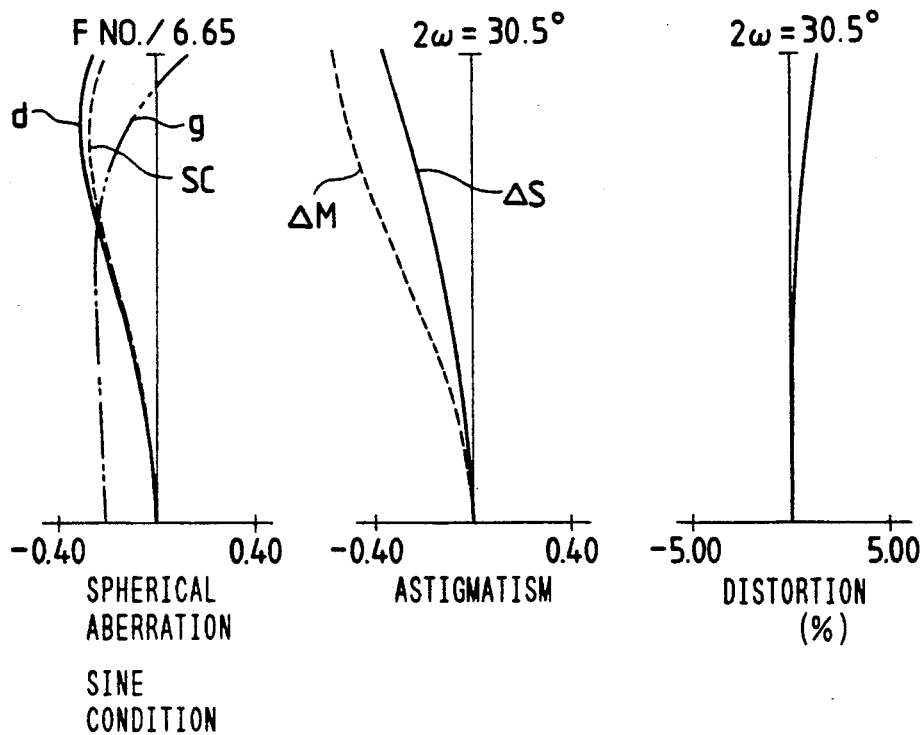
Figure 11C:
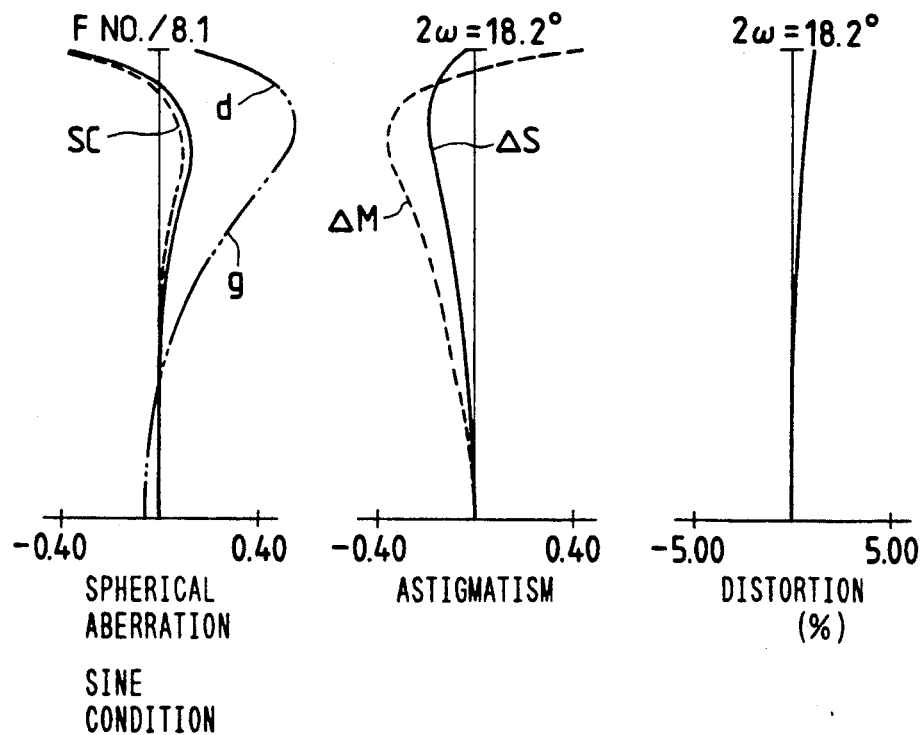

In the zoom lenses according to these embodiments, when magnification change is effected from the wide angle end to the telephoto end, the refractive powers of the first unit to the fourth unit are set appropriately as shown in the respective figures, and in the embodiment of FIGS. 8A to 8C, the first to fourth units are moved toward the object side independently of one another, and in the embodiment of FIGS. 9A to 9C, the first to third units are moved toward the object side independently of one another, so that the fourth unit may always effect one-to-one or higher magnification change.

Thus, there is provided a zoom lens of high optical performance in which a predetermined magnification change ratio is easily secured and aberration fluctuation resulting from magnification change is small.

Also, during the magnification change from the wide angle end to the telephoto end, each lens unit is thus moved toward the object side, whereby the shortening of the full lens length at the wide angle end is effectively accomplished. That is, there is adopted such a refractive power arrangement that the full lens length is short on the wide angle side and long on the telephoto side.

Description will now be made of the features of the paraxial refractive power arrangement of the zoom lens according to the present embodiment.

When the refractive power of the composite system comprising the first, second and third units is $\phi_{123}$ and the refractive power of the fourth unit is $\phi_4$ and the principal point spacing between the rearward principal point $O'_{123}$ of the composite system comprising the first, second and third units and the forward principal point $O_4$ of the fourth unit is e, the refractive power $\phi$ of the entire system is $$\phi = \phi_{123} + \phi_4 - e \cdot \phi_{123} \cdot \phi_4 \ldots \quad (a)$$

The refractive power $\phi_{123}$ of the composite system comprising the first, second and third units is a small positive value during the magnification change from the wide angle end to the telephoto end. The refractive power $\phi_4$ is a negative value. Accordingly, to make the refractive power $\phi$ of the entire system still smaller by magnification change and achieve a high magnification, if design is made such that the value of the principal point spacing e becomes smaller during the magnification change from the wide angle end to the telephoto end, there may preferably be provided an increased magnification. In addition, when the amounts of movement of the third and fourth lens units during the magnification change from the wide angle end to the telephoto end are M3 and M4, the condition that $0 \leq M4/M3 < 3 \ldots$ (6) is satisfied.

That is, if design is made such that at least the formula (6) is satisfied during the magnification change from the wide angle end to the telephoto end, a high magnification change ratio will become possible by a change in the principal point spacing e.

Particularly in the present embodiment, even if the fourth unit is fixed as shown in FIGS. 9A to 9C, that is even if M4=0, if design is made such that the formula (6), including a change in the position of the principal point in the combined refractive power $\phi_{123}$ of the first, second and third units, is satisfied as relative movement, it will become easy to obtain a high magnification change ratio of the entire lens system and it will also become possible to simplify the mechanism.

If the amount of movement M4 of the fourth unit becomes too great beyond the upper limit of the condition (6), the spacing between the third unit and the fourth unit will become small at the telephoto end and the entire lens system will become bulky, and this is not good. If the lower limit of the condition (6) is exceeded, the fourth unit will tend to assume a reverse magnification change with magnification change and further, it will become necessary to secure a great spacing in advance between the fourth unit and the film surface (the imaging plane) and the full lens length will become increased, and this is not good.

In the present embodiment, to secure a predetermined magnification change ratio and yet make the entire lens system more compact, it is preferable to set the aforementioned condition (6) to $$0 \leq M4/M3 < 0.9 \ldots \quad (6a)$$

In the present embodiment, the fourth unit is of negative refractive power and barrel type distortion (negative distortion) created in the first unit chiefly at the wide angle end is made small.

Particularly, the fourth unit is constructed so as to have at least one negative lens having its concave surface facing the object side, and the principal point of the entire system is positioned toward the object side so that the entire system may be of the tele type, thereby achieving the compactness of the entire lens system.

In addition, the zoom lens of the present invention may preferably adopt the following constructions.

(i) In the present embodiment, to correct well aberration fluctuation resulting from magnification change and yet obtain a predetermined magnification change ratio effectively, it is preferable that the following condition be satisfied:

$$0.05 < |f3/f4| < 0.9, \ldots \quad (7)$$

where f3 and f4 are the focal lengths of the third unit and the fourth unit, respectively.

If the upper limit of the condition (7) is exceeded, the refractive power of the third unit which contributes most to magnification change will become too weak, and to obtain a predetermined magnification change ratio, the amount of movement of the third unit will have to be increased and the entire lens system will become bulky, and this is not suitable. Or the refractive power of the second unit will become too strong and Petzval sum will become great in the positive direction and the imaging plane characteristic particularly in the zoom intermediate portion will greatly fall down to under, and this is not suitable. If the lower limit of the condition (7) is exceeded, particularly the refractive power of the second unit will become too weak and it will become necessary to make the movable portion which is necessary for magnification change, i.e., the spacing between the second unit and the first unit and the spacing between the second unit and the third unit great and thus, the entire lens system will become bulky, and this is not suitable.

(ii) In the present invention, to correct particularly distortion and curvature of image field well, it is preferable to set the focal length f4 of the fourth unit as follows:

$$4.0 < |f4/fw| < 15.0, \ldots \quad (8)$$

where fw is the focal length of the entire system at the wide angle end.

If the focal length of the fourth unit becomes too long beyond the upper limit of the condition (8), the amount of movement of each lens unit for obtaining a predetermined magnification change ratio will become greater from the aforementioned equation (a) and the entire lens system will become bulky, and this is not good. If the focal length of the fourth unit becomes too short beyond the lower limit of the condition (8), barrel type distortion (negative distortion) will become greater on the wide angle side and Petzval sum will increase in the positive direction and curvature of image field will become under-corrected particularly in the intermediate zoom area, and this is not good.

(iii) In the present invention, to make the entire lens system compact, it is preferable to set the refractive power and lens construction of each lens unit so as to satisfy the following condition:

$$0.13 < bf \cdot min/fw < 0.7, \ldots \quad (9)$$

where bf·min is the shortest distance of the back focus in the entire magnification change range.

If the upper limit of the condition (9) is exceeded, the entire lens system will become bulky, and if the lower limit of the condition (9) is exceeded, the fourth unit will become too proximate to the imaging plane and dust or the like in the fourth unit will be reflected on the photosensitive surface, and this is not good.

(iv) To correct well the fluctuation of on-axis chromatic aberration resulting from magnification change, it is preferable that the following condition be satisfied:

$$V_{2p} > 50, \ldots \quad (10)$$

where $V_{2p}$ is the Abbe number of the material of a positive lens in the second unit which is disposed most adjacent to the object side.

(v) In the present invention, to correct well introversive coma flare and barrel type distortion caused by downward light rays chiefly on the wide angle side, it is preferable that an aspherical surface of a shape in which positive refractive power becomes stronger or negative refractive power becomes weaker toward the marginal portion of the lens be provided on at least one lens surface of the first unit.

(vi) Also, to correct introversive coma caused by upward light rays on the telephoto side, it is preferable that an aspherical surface of a shape in which positive refractive power becomes weaker or negative refractive power becomes stronger toward the marginal portion of the lens be provided on at least one lens surface of the third unit or the fourth unit.

(vii) It is preferable that focusing be effected by the first unit, but alternatively, focusing may be effected by the third unit or the fourth unit. As a further alternative, only a particular area, for example, only the close distance, may be focused by the third unit or the fourth unit. According to this, focusing of a closer distance becomes possible and an increase in the diameter of the forward lens can be prevented, and this is preferable.

(viii) During magnification change, the second unit may be divided into two lens units, for example, two lens units with a stop interposed therebetween, and the two lens units may be moved independently of each other, and according to this, aberration fluctuation resulting from magnification change can be corrected better and a high magnification change ratio becomes easy to obtain, and this is preferable.

Some numerical value embodiments of the present invention will now be shown. In the numerical value embodiments below, Ri represents the radius of curvature of the ith lens surface from the object side, Di represents the thickness and air space of the ith lens from the object side, and Ni and Vi represent the refractive index and the Abbe number, respectively, of the glass of the ith lens from the object side.

Also, the relations between the aforementioned conditions and the numerical values in the numerical value embodiments are shown in Table 1.

| Numerical Value Embodiment 4 | | | |
|---|---|---|---|
| F = 36.19~110.0 | FNO = 1:2.8~6.8 | 2ω = 61.7°~22.25° | |
| R1 = −70.39 | D1 = 1.70 | N1 = 1.77250 | ν1 = 49.6 |
| R2 = 28.43 | D2 = 2.74 | | |

-continued

| Numerical Value Embodiment 4 | | | |
|---|---|---|---|
| R3 = 34.05 | D3 = 4.43 | N2 = 1.72825 | ν2 = 28.5 |
| R4 = 840.53 | D4 = variable | | |
| R5 = 48.56 | D5 = 2.94 | N3 = 1.51633 | ν3 = 64.1 |
| R6 = −79.92 | D6 = 0.20 | | |
| R7 = 31.72 | D7 = 4.90 | N4 = 1.57135 | ν4 = 53.0 |
| R8 = −26.41 | D8 = 4.02 | N5 = 1.84666 | ν5 = 23.9 |
| R9 = 783.46 | D9 = 2.00 | | |
| R10 = stop | D10 = 4.20 | | |
| R11 = 64.27 | D11 = 0.83 | N6 = 1.83400 | ν6 = 37.2 |
| R12 = 27.05 | D12 = 1.47 | | |
| R13 = 57.96 | D13 = 3.20 | N7 = 1.69895 | ν7 = 30.1 |
| R14 = −40.65 | D14 = variable | | |
| R15 = 126.64 | D15 = 4.08 | N8 = 1.58144 | ν8 = 40.8 |
| R16 = −34.65 | D16 = 4.01 | | |
| R17 = −25.41 | D17 = 1.20 | N9 = 1.83400 | ν9 = 37.2 |
| R18 = 670.05 | D18 = 0.82 | | |
| R19 = −146.99 | D19 = 1.50 | N10 = 1.62299 | ν10 = 58.1 |
| R20 = 72.48 | D20 = variable | | |
| R21 = −95.96 | D21 = 2.00 | N11 = 1.60311 | ν11 = 60.7 |
| R22 = −243.02 | | | |

| Variable spacing | Focal length | | |
|---|---|---|---|
| | W 36.19 | M 66.37 | T 109.00 |
| D4 | 21.90 | 10.06 | 0.96 |
| D14 | 12.74 | 3.54 | 0.48 |
| D20 | 2.33 | 13.98 | 20.72 |

| Numerical Value Embodiment 5 | | | |
|---|---|---|---|
| F = 36.19~135.05 | FNO = 1:3.6~8.1 | 2ω = 61.7°~18.2° | |
| R1 = −108.75 | D1 = 1.75 | N1 = 1.83481 | ν1 = 42.7 |
| R2 = 26.52 | D2 = 2.50 | | |
| R3 = 30.55 | D3 = 4.70 | N2 = 1.74077 | ν2 = 27.8 |
| R4 = 391.32 | D4 = variable | | |
| R5 = 38.53 | D5 = 3.17 | N3 = 1.51633 | ν3 = 64.1 |
| R6 = −85.80 | D6 = 0.20 | | |
| R7 = 26.78 | D7 = 4.73 | N4 = 1.58267 | ν4 = 46.4 |
| R8 = −31.69 | D8 = 1.71 | N5 = 1.84666 | ν5 = 23.9 |
| R9 = 126.19 | D9 = 5.74 | | |
| R10 = stop | D10 = 0.80 | | |
| R11 = 62.28 | D11 = 1.08 | N6 = 1.83400 | ν6 = 37.2 |
| R12 = 21.92 | D12 = 1.18 | | |
| R13 = 39.71 | D13 = 2.95 | N7 = 1.68893 | ν7 = 31.1 |
| R14 = −52.35 | D14 = variable | | |
| R15 = 82.28 | D15 = 3.50 | N8 = 1.58144 | ν8 = 40.8 |
| R16 = −35.30 | D16 = 0.10 | | |
| R17 = 384.26 | D17 = 1.30 | N9 = 1.83400 | ν9 = 37.2 |
| R18 = 35.12 | D18 = 5.96 | | |
| R19 = −15.29 | D19 = 1.50 | N10 = 1.60311 | ν10 = 60.7 |
| R20 = −53.93 | D20 = variable | | |
| R21 = −117.00 | D21 = 2.00 | N11 = 1.60311 | ν11 = 60.7 |
| R22 = −192.40 | | | |

| Variable spacing | Focal length | | |
|---|---|---|---|
| | 36.19 | 79.25 | 135.05 |
| D4 | 26.09 | 10.08 | 0.96 |
| D14 | 14.12 | 3.38 | 0.51 |
| D20 | 1.00 | 37.14 | 75.09 |

TABLE 1

| | Numerical value embodiments | |
|---|---|---|
| Conditions | 4 | 5 |
| (6)M4/M3 | 0.67 | 0 |
| (7)|f3/f4| | 0.167 | 0.084 |
| (8)|f4/fw| | 7.3 | 13.8 |
| (9)bf · min/fw | 0.249 | 0.194 |
| (10)ν2P | 64.1 | 64.1 |

Finally, an embodiment in which during the magnification change from the wide angle side to the telephoto side, each lens unit is moved so that the lateral magnification of each lens unit may always increase, thereby earning the zoom ratio effectively will be described with reference to FIG. 12 and so on In the zoom lens according to the present embodiment, when magnification change is to be effected from the wide angle end to the telephoto end, the first unit has a convex locus on the imaging plane side and is positioned on the object side at the telephoto end as compared with the wide angle end.

Generally in a two-unit zoom lens comprising two lens units, when the refractive power of the first unit is $\phi_1$ and the refractive power of the second unit is $\phi_2$ and the spacing between the principal points of the two lens units is e, the refractive power $\phi$ of the composite system is $$\phi = \phi_1 + \phi_2 - e \times \phi_1 \times \phi_2 \ldots \quad (a)$$

When the signs of the refractive powers $\phi_1$ and $\phi_2$ are opposite to each other and the refractive power $\phi$ is positive, $\phi_1 \times \phi_2$ is negative and therefore, if the principal point spacing e becomes smaller with magnification change, the magnification change from the wide angle end to the telephoto end will be effected.

Figure 12:
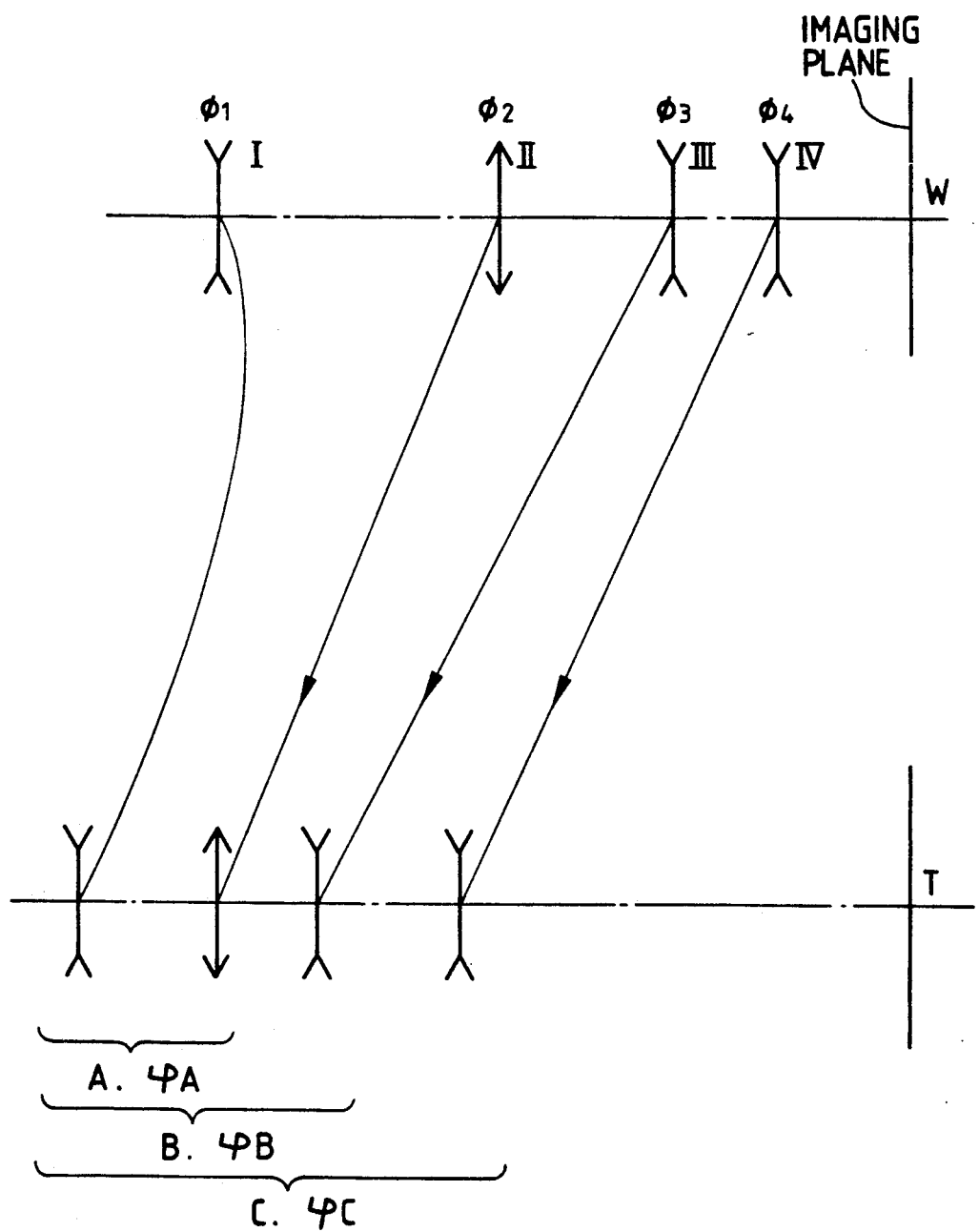
FIG. 12 is an illustration of the paraxial refractive power arrangement of the zoom lens of the present invention.
Figure 13A:
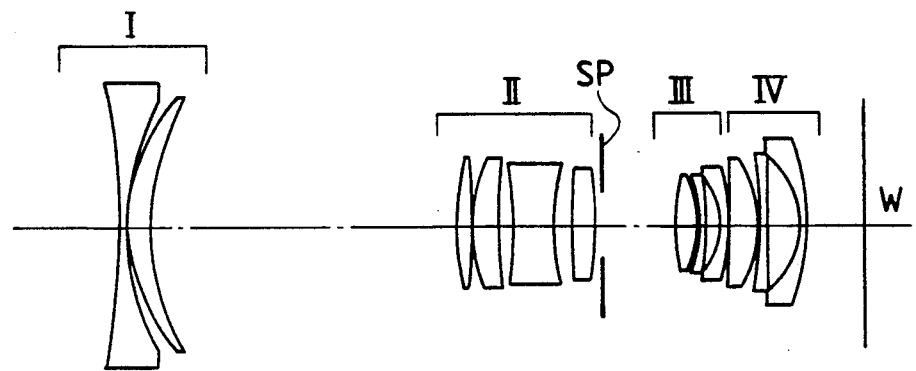
FIGS. 13A to 14B are cross-sectional views of the lenses of numerical value embodiments 6 and 7 of the present invention.
Figure 13B:
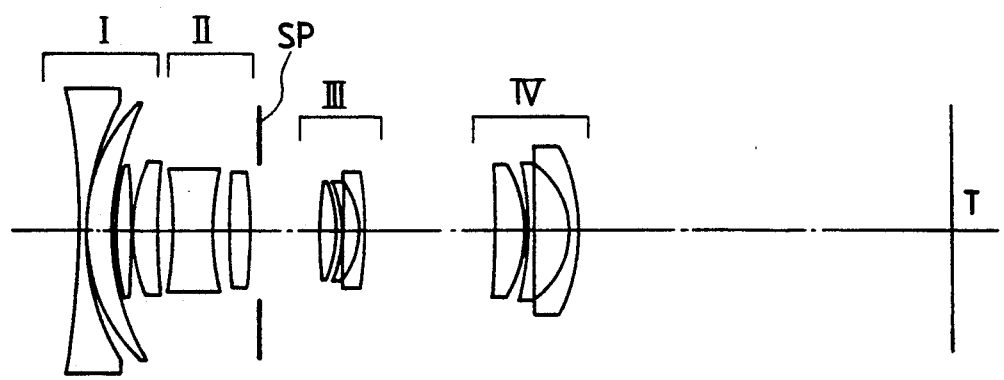
Figure 14A:
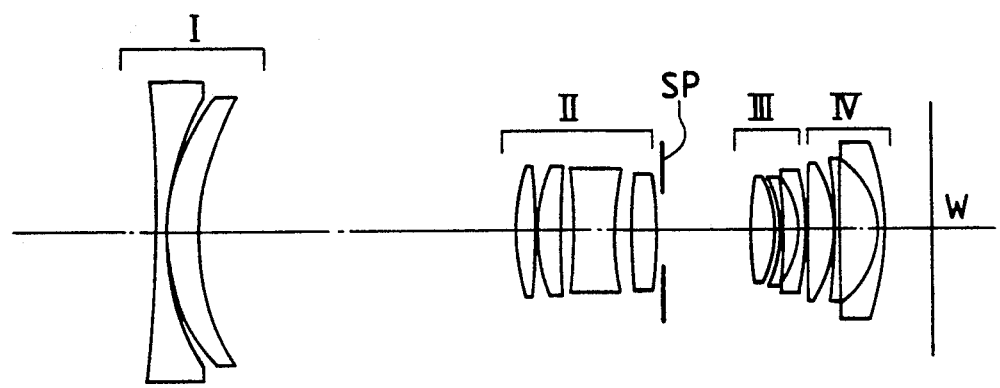
Figure 14B:
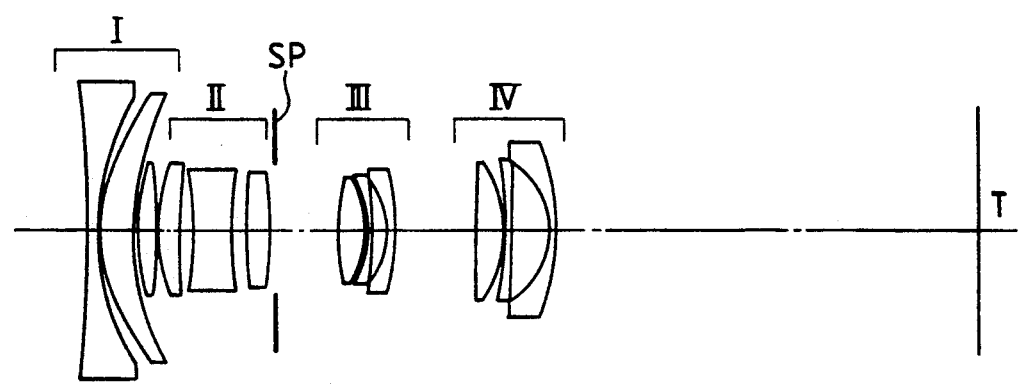
Figure 15A:
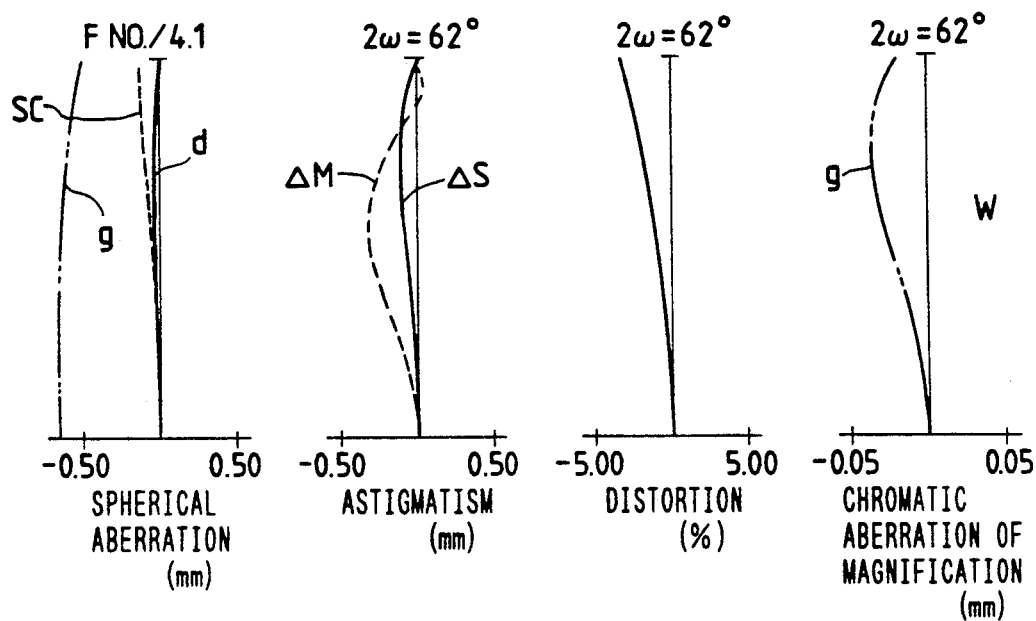
FIGS. 15A to 16C show the various aberrations in numerical value embodiments 6 and 7 of the present invention.
Figure 15B:
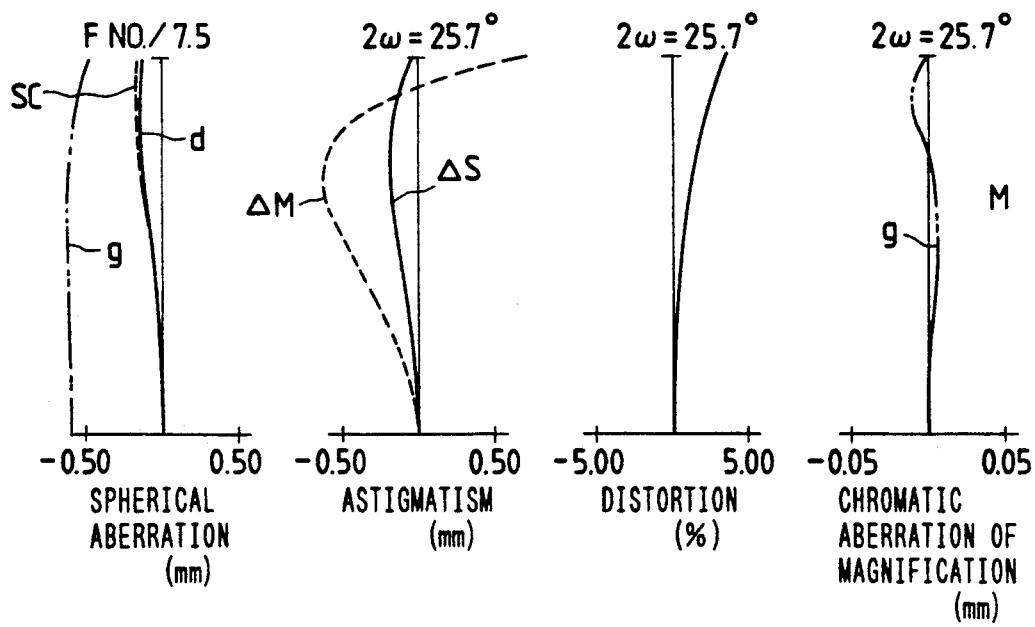
Figure 15C:
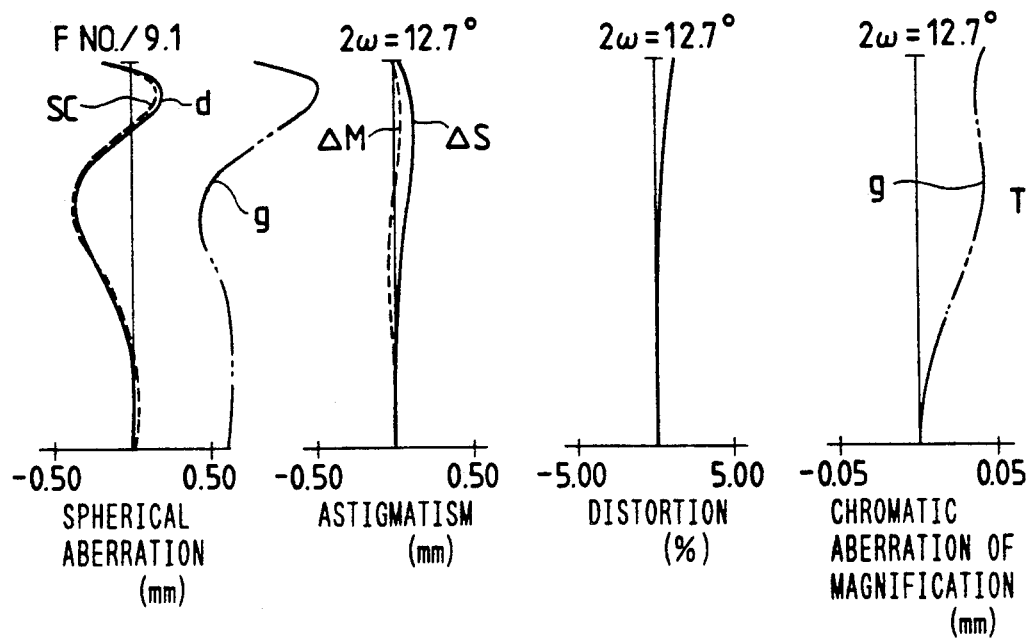
Figure 16A:
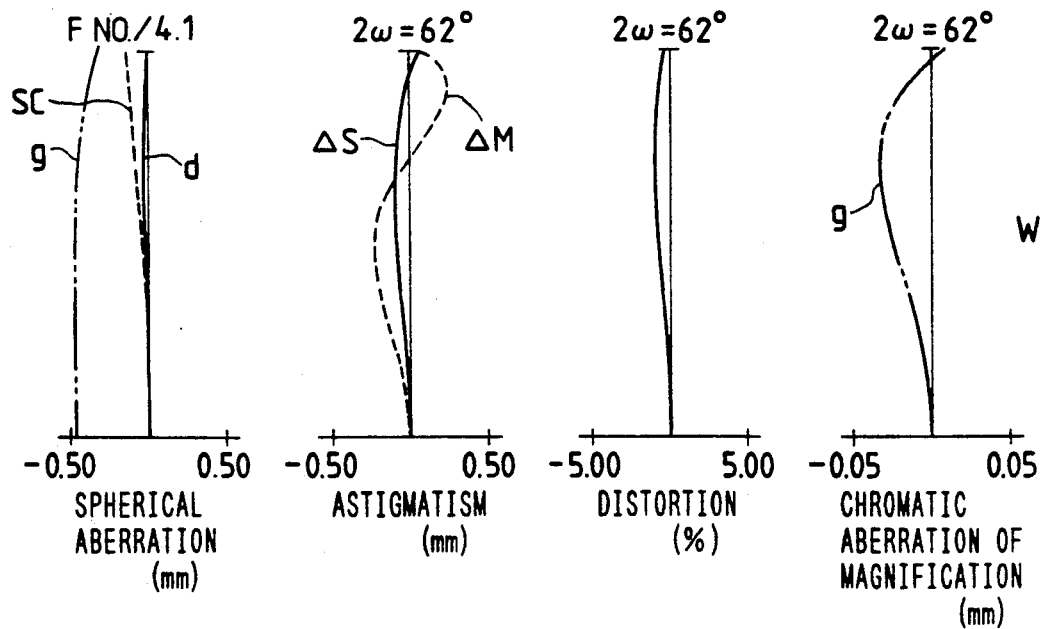
Figure 16B:
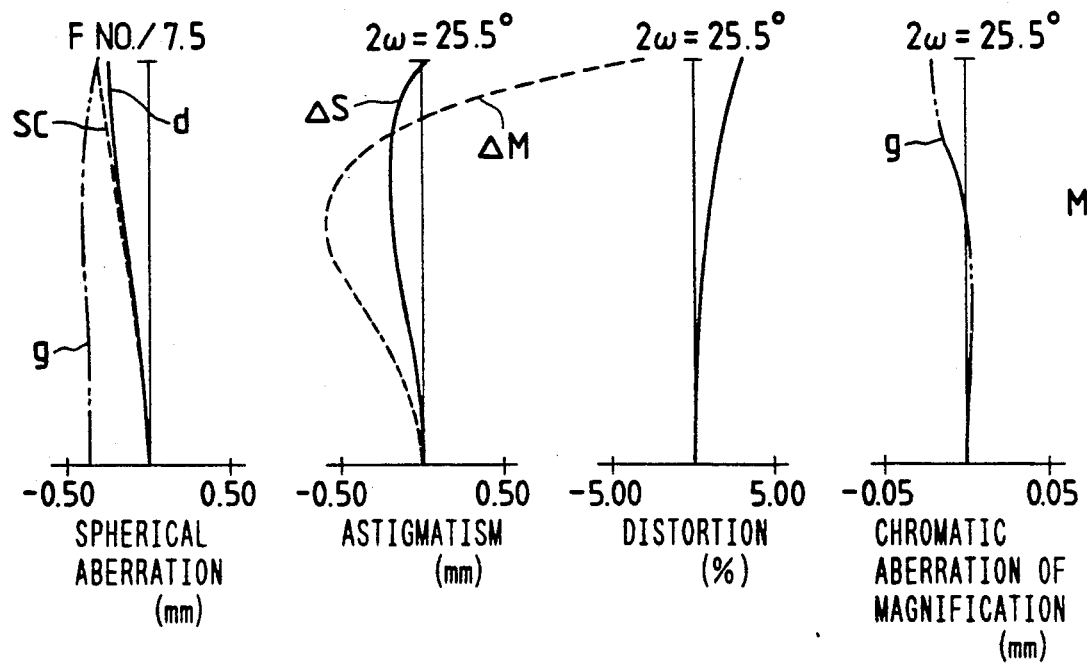
Figure 16C:
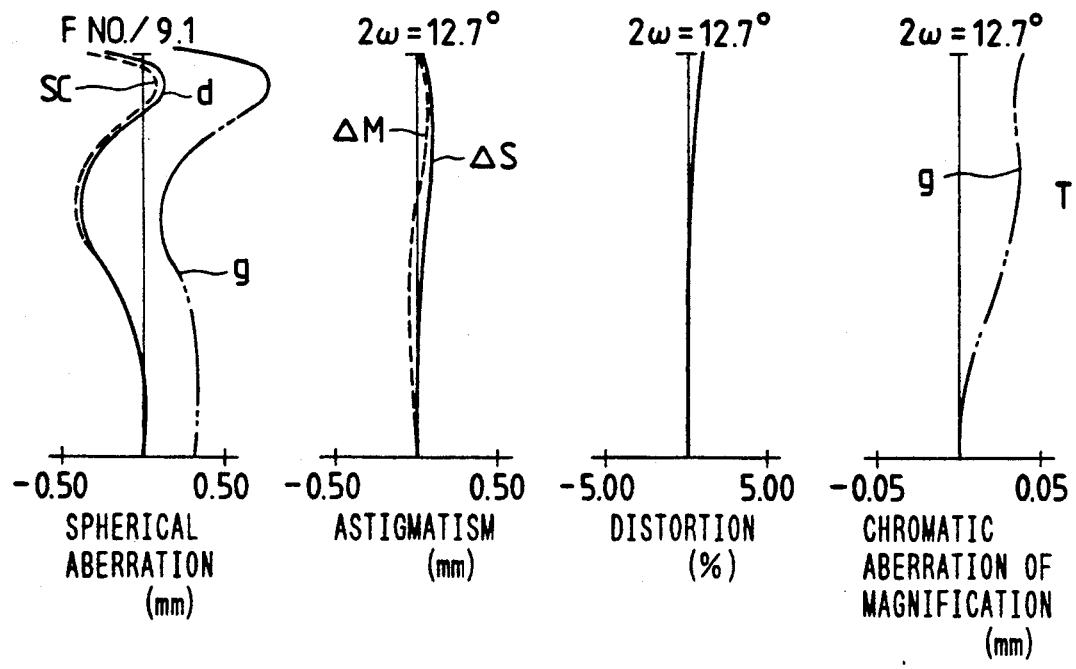

As shown in FIG. 12, in the present embodiment, during the magnification change from the wide angle end to the telephoto end, the principal point spacing e between the first unit and the second unit becomes smaller so that the combined refractive power ΔA of the composite system A may become stronger on the basis of the equation (a) during the magnification change from the wide angle end to the telephoto end. The combined refractive power $\phi$A at this time is positive.

Next, the then composite system A comprising the first and second units is considered to be a lens unit, and with regard also to the combined refractive power $\phi$B of the composite system B comprising the third unit in addition to the first and second unit, the principal point spacing between the principal point position of the composite system A and the principal point position of the third unit may become relatively small over the wide angle end to the telephoto end in a similar manner so that the composite system B may also be increased in magnification on the basis of the equation (a).

Further, the composite system B is considered to be a lens unit and with regard also to the combined refractive power $\phi$C of the composite system C comprising the fourth unit in addition to the first, second and third units, the principal point spacing between the principal point position of the composite system B and the principal point position of the fourth unit may become relatively small over the wide angle end to the telephoto end so that the composite system C may also be increased in magnification on the basis of the equation (a).

In the present invention, on the basis of the concept as described above, the second, third and fourth units are all moved toward the object side during the magnification change from the wide angle end to the telephoto end so that all the lens units may contribute to an increase in magnification to thereby achieve a high magnification change ratio effectively.

At this time, in the present invention, of the ratios Z of the paraxial lateral magnifications of the lens units in the magnification change from the wide angle end to the telephoto end, the paraxial lateral magnification of the second unit for which the relative fluctuation of the principal point spacing is easy may be made greatest to thereby make a high magnification change ratio easier to obtain.

The zoom lens to which the present invention is directed is achieved by satisfying the above-described conditions, and preferably, each lens unit should be constructed as follows.

(i) To satisfy the following conditions:

$$0.3 < |M2/\Delta f| < 0.6 \ldots \quad (11)$$

$$0.15 < |M4/\Delta f| < 0.6 \ldots \quad (12)$$

where $\Delta f$ is the amount of variation in the focal length resulting from the magnification change from the wide angle end to the telephoto end, and M2 and M4 are the amounts of movement of the second unit and the fourth unit, respectively.

If the upper limits of the conditions (11) and (12) are exceeded, the full lens length will become too long, and if the lower limits of these conditions are exceeded, the refractive power of each lens unit will have to be made strong to obtain a desired magnification change ratio and therefore, curvature of image field will fluctuate greatly in the positive direction, and this is not good.

(ii) In the present invention, in spite of the refractive power of the entire system being always positive, the great number of the lens units of negative refractive power leads to the tendency that Petzval sum becomes negative and curvature of image field becomes over.

Therefore, in the present invention, it is necessary to provide at least two positive lenses of refractive index of 1.65 or less in the entire system. If this is done, curvature of image field can be corrected well.

(iii) In the present invention, to achieve particularly the compactness of the entire lens system, it is preferable to set the refractive power and lens construction of each lens unit so as to satisfy the following condition:

$$0.13 < bf \cdot min/fw < 0.7, \ldots \quad (13)$$

where bf·min is the shortest distance of the back focus in the whole magnification change range.

If the upper limit of the condition (13) is exceeded, the entire lens system will become bulky, and if the lower limit of this condition is exceeded, the fourth unit will become too proximate to the imaging plane and dust or the like in the fourth unit will be reflected on the photosensitive surface, and this is not good.

(iv) It is preferable that an aspherical surface of a shape in which negative refractive power becomes weak or positive refractive power becomes strong over of the effective lens diameter as compared with the central portion be provided on at least one lens surface of the third and fourth units, because if this is done, coma can be corrected well over the whole magnification change range.

(v) It is preferable that the fourth unit be comprised, in succession from the object side, of a positive 41st lens having its surface of strong refractive power facing the imaging plane side, a negative 42nd lens having two concave lens surface and a meniscus-shaped 43rd lens having is convex surface facing the imaging plane side, because if this is done, aberration fluctuation can be reduced over the whole magnification change range and a high optical performance can be obtained.

(vi) When the paraxial lateral magnifications resulting from the magnification change of the fourth unit from the wide angle end to the telephoto end have one-to-one magnification interposed therebetween and the magnification ratio thereof is $Z_4$, it is preferable that the following condition be satisfied:

$$1.2 < Z_4 < 1.5 \ldots \quad (14)$$

If the upper limit of the condition (14) is exceeded, the amount of movement of the fourth unit will become great and the lens system will become bulky. Or the negative refractive power of the fourth unit will become strong and Petzval sum will increase in the negative direction and curvature of image field will become over.

If the lower limit of the condition (14) is exceeded, the distribution of the magnification change ratios of the respective units for achieving a high magnification change ratio will not be accomplished well and it will become difficult to obtain a high mangification change ratio.

(vii) Focusing may be effected by the first unit or the third unit, or alternatively may be effected by moving the whole. Also, it is preferable to effect focusing by moving the first unit up to a certain object distance, and by moving the third unit or the first unit and the third unit as a unit up to an object closer than said certain object distance, because if this is done, aberration fluctuation will become smaller.

(viii) It is preferable in aberration correction that the first unit be comprised of a negative 11th lens having two concave lens surfaces and a meniscus-shaped positive 12th lens having its convex surface facing the object side, the second unit be comprised of two positive 21st and 22nd lenses, a negative 23rd lens having two concave lens surfaces and a positive 24th lens, and the third unit be comprised of a positive 31st lens having two convex lens surfaces and two meniscusshaped negative 32nd and 33rd lenses each having its convex surface facing the imaging plane side.

Some numerical value embodiments of the present invention will now be shown. In the numerical value embodiments below, Ri represents the radius of curvature of the ith lens surface from the object side, Di represents the thickness and air space of the ith lens from the object side, and Ni and Vi represent the refractive index and the Abbe number, respectively, of the glass of the ith lens from the object side.

When the direction of the optic axis is the X axis and the direction perpendicular to the optic axis is the H axis and the direction of travel of light is positive and R is the paraxial radius of curvature and A, B, C, D, E, F, G and h are asphericity coefficients, the aspherical shape is expressed by the following equation:

$$X = \frac{(1/R) H^2}{1 + \sqrt{1 - (H/R)^2}} + AH^2 + BH^4 + CH^6 + DH^8 +$$

$$EH^{10} + FH^{12} + GH^{14} + hH^{16}$$

The relations between the aforementioned conditions and the numerical values in the numerical value embodiments are shown in Table 2.

| Numerical Value Embodiment 6 | | | |
|---|---|---|---|
| $F = 36.20 \sim 194.03$ | $FNO = 1:4.1 \sim 9.1$ | $2\omega = 62° \sim 12.7°$ | |
| R1 = −149.18 | D1 = 1.44 | N1 = 1.69680 | ν1 = 55.5 |
| R2 = 46.98 | D2 = 0.19 | | |
| R3 = 32.88 | D3 = 3.76 | N2 = 1.69895 | ν2 = 30.1 |
| R4 = 43.35 | D4 = variable | | |

-continued

Numerical Value Embodiment 6

| | | | |
|---|---|---|---|
| R5 = 41.67 | D5 = 2.85 | N3 = 1.56013 | $\nu3$ = 47.0 |
| R6 = −329.64 | D6 = 0.18 | | |
| R7 = 24.65 | D7 = 4.78 | N4 = 1.56013 | $\nu4$ = 47.0 |
| R8 = 254.11 | D8 = 1.96 | | |
| R9 = −76.23 | D9 = 7.56 | N5 = 1.84666 | $\nu5$ = 23.9 |
| R10 = 57.90 | D10 = 2.32 | | |
| R11 = 123.93 | D11 = 4.08 | N6 = 1.70154 | $\nu6$ = 41.2 |
| R12 = −79.81 | D12 = 1.20 | | |
| R13 = stop | D13 = variable | | |
| R14 = 63.98 | D14 = 3.02 | N7 = 1.60729 | $\nu7$ = 49.2 |
| R15 = −22.78 | D15 = 0.76 | | |
| R16 = −23.64 | D16 = 1.21 | N8 = 1.75700 | $\nu8$ = 47.8 |
| R17 = −41.91 | D17 = 1.70 | | |
| R18 = −15.49 | D18 = 1.52 | N9 = 1.77250 | $\nu9$ = 49.6 |
| R19 = −54.08 | D19 = variable | | |
| R20 = −1187.44 | D20 = 5.13 | N10 = 1.66998 | $\nu10$ = 39.3 |
| R21 = −21.99 | D21 = 0.14 | | |
| R22 = −81.14 | D22 = 1.30 | N11 = 1.83400 | $\nu11$ = 37.2 |
| R23 = 281.16 | D23 = 5.65 | | |
| R24 = −15.26 | D24 = 1.52 | N12 = 1.62299 | $\nu12$ = 58.1 |
| R25 = −40.14 | | | |

| | Focal length | | |
|---|---|---|---|
| Variable spacing | W | M | T |
| | 36.20 | 94.85 | 194.03 |
| D4 | 52.43 | 11.75 | 0.73 |
| D13 | 13.10 | 12.13 | 10.53 |
| D19 | 0.44 | 18.49 | 22.26 |

R18 aspherical surface
$A = 0$, $B = 1.68 \times 10^{-5}$,
$C = 1.53 \times 10^{-7}$, $D = -4.36 \times 10^{-9}$,
$E = 4.43 \times 10^{-11}$, $F = -6.44 \times 10^{-14}$,
$G = 2.03 \times 10^{-15}$, $h = -4.06 \times 10^{-17}$

Numerical Value Embodiment 7

$F = 36.2 \sim 194.01$    $FNO = 1:4.1 \sim 9.1$    $2\omega = 62° \sim 12.7°$

| | | | |
|---|---|---|---|
| R1 = −171.46 | D1 = 1.44 | N1 = 1.69680 | $\nu1$ = 55.5 |
| R2 = 45.33 | D2 = 0.19 | | |
| R3 = 33.77 | D3 = 5.81 | N2 = 1.72825 | $\nu2$ = 28.5 |
| R4 = 45.85 | D4 = variable | | |
| R5 = 42.07 | D5 = 3.37 | N3 = 1.53172 | $\nu3$ = 48.9 |
| R6 = −283.17 | D6 = 0.18 | | |
| R7 = 25.52 | D7 = 4.46 | N4 = 1.56013 | $\nu4$ = 47.0 |
| R8 = 314.90 | D8 = 1.84 | | |
| R9 = −75.66 | D9 = 7.06 | N5 = 1.84666 | $\nu5$ = 23.9 |
| R10 = 57.02 | D10 = 2.58 | | |
| R11 = 146.48 | D11 = 4.21 | N6 = 1.70154 | $\nu6$ = 41.2 |
| R12 = −76.87 | D12 = 1.20 | | |
| R13 = stop | D13 = variable | | |
| R14 = 64.38 | D14 = 4.15 | N7 = 1.60729 | $\nu7$ = 49.2 |
| R15 = −22.04 | D15 = 0.54 | | |
| R16 = −23.20 | D16 = 1.21 | N8 = 1.75700 | $\nu8$ = 47.8 |
| R17 = −45.51 | D17 = 2.10 | | |
| R18 = −15.10 | D18 = 1.52 | N9 = 1.77250 | $\nu9$ = 49.6 |
| R19 = −46.74 | D19 = variable | | |
| R20 = 3161.51 | D20 = 4.44 | N10 = 1.66998 | $\nu10$ = 39.3 |
| R21 = −22.14 | D21 = 0.16 | | |
| R22 = −89.84 | D22 = 1.30 | N11 = 1.83400 | $\nu11$ = 37.2 |
| R23 = 531.68 | D23 = 6.04 | | |
| R24 = −15.39 | D24 = 1.52 | N12 = 1.62299 | $\nu12$ = 58.1 |
| R25 = −45.66 | | | |

| | Focal length | | |
|---|---|---|---|
| Variable spacing | W | M | T |
| | 36.20 | 95.65 | 194.06 |
| D4 | 54.27 | 12.05 | 0.76 |
| D13 | 15.15 | 14.02 | 11.23 |
| D19 | 0.41 | 15.93 | 14.14 |

R18 aspherical
$A = 0$, $B = 2.19 \times 10^{-5}$,
$C = 1.46 \times 10^{-7}$, $D = -4.18 \times 10^{-9}$,
$E = 4.65 \times 10^{-11}$, $F = -1.04 \times 10^{-13}$,
$G = 1.7 \times 10^{-15}$, $h = -2.58 \times 10^{-17}$

TABLE 2

| Conditions | Numerical value embodiments | |
|---|---|---|
| | 6 | 7 |
| $|M2/\Delta f|$ | 0.469 | 0.475 |
| $|M3/\Delta f|$ | 0.347 | 0.413 |
| b.f · min/fw | 0.26 | 0.23 |
| $Z_4$ | 1.31 | 1.23 |

According to the present invention, in a zoom lens comprising four lens units of predetermined refractive powers, the movement conditions of the respective lens units resulting from magnification change and the lens constructions of the respective lens units are set as previously described, whereby there can be achieved a zoom lens having a high magnification change ratio of the order of 3–5.5 and yet having a short full lens length and a high optical performance over the whole magnification change range.

What is claimed is:

1. A magnification changing lens comprising in succession from an object side:
   a first lens unit having a negative refractive power;
   a second lens unit having a positive refractive power;
   a third lens unit having a negative refractive power; and
   the last lens unit;
   wherein said second lens unit and said third lens unit are moved toward the object side during magnification change from wide angle end to telephoto end, and unit spacing between said first lens unit and said second lens unit and unit spacing between said second lens unit and said third lens unit at the telephoto end are smaller and unit spacing between said third lens unit and said last lens unit at the telephoto end is greater than at the wide angle end.

2. A magnification changing lens according to claim 1, wherein the paraxial lateral magnification of said last lens unit always has a positive value.

3. A magnification changing lens according to claim 2, wherein said last lens unit has a positive refractive power.

4. A magnification changing lens according to claim 2 wherein, when an amount of movement of said third lens unit and said last lens unit during the magnification change from the wide angle end to the telephoto end are M3 and M4, respectively, and an amount of movement toward the imaging plane side is positive, the following condition is satisfied:

$$-1 < M4/M3 < 0.8.$$

5. A magnification changing lens according to claim 4, whwerein said last lens unit is fixed during magnification change.

6. A magnification changing lens according to claim 4, wherein when the focal lengths of said second and third lens units are f2 and f3, respectively, and the following condition is satisfied:

$$0.8 < |f3/f2| < 1.4.$$

7. A magnification changing lens according to claim 6, wherein when the focal length of said last lens unit is f4 and the focal length of the entire system at the wide angle end is fw, and the following condition is satisfied:

$$1.5 < f4/fw < 7.0.$$

8. A magnification changing lens according to claim 2, wherein said last lens unit has a negative refractive power.

9. A magnification changing lens according to claim 8, wherein said last lens unit always has a magnification of one-to-one or higher.

10. A magnification changing lens according to claim 9, wherein when an amount of movement of said third lens unit and said last lens unit during the magnification change from the wide angle end to the telephoto end are M3 and M4, respectively, following condition is satisfied:

$$0 \leq M4/M3 < 3.$$

11. A magnification changing lens according to claim 10, wherein said last lens unit is fixed during magnification change.

12. A magnification changing lens according to claim 10, wherein said last lens unit has at least one negative lens having its concave surface facing the object side.

13. A magnification changing lens according to claim 12, wherein when the focal lengths of said third lens unit and said last lens unit are f3 and f4, respectively, following condition is satisfied:

$$0.05 < |f3/f4| < 0.9.$$

14. A magnification changing lens according to claim 13, wherein when the focal length of the entire system at the wide angle end is fw, the following condition is satisfied:

$$4.0 < |f4/fw| < 15.0.$$

15. A magnification changing lens according to claim 1, wherein during the magnification change from the wide angle end to the telephoto end, each lens unit is moved so that the lateral magnifications of said second, third and last lens units may always increase.

16. A magnification changing lens according to claim 15, wherein when an amount of variation in the focal length of the entire system resulting from the magnification change from the wide angle end to the telephoto end is $\Delta f$ and amounts of movement of said second lens unit and said last lens unit are M2 and M4, respectively, following conditions are satisfied:

$$0.3 < |M2/\Delta f| < 0.6$$

$$0.15 < |M4/\Delta f| < 0.6.$$

17. A magnification changing lens comprising in succession from an object side:
   a first lens unit having a negative refractive power;
   a second lens unit having a positive refractive power;
   a third lens unit having a negative refractive power; and
   the last lens unit;
   wherein a magnification change from wide angle end to telephoto end is accomplished by moving at least said second lens unit and said third lens unit toward the object side, and when the shortest distance of a back focus in the whole magnification change range is bf·min and focal length of the entire system at the wide angle end is fw, following condition is satisfied:

$$0.13 < bf\cdot min/fw < 0.7.$$

18. A magnification changing lens according to claim 17, wherein said last lens unit has a positive refractive power.

19. A magnification changing lens according to claim 18, wherein when an amount of movement of said third lens unit and said last lens unit during the magnification change from the wide angle end to the telephoto end are M3 and M4, respectively, and an amount of movement toward imaging plane side is positive, following condition is satisfied:

$$-1 < M4/M3 < 0.8.$$

20. A magnification changing lens according to claim 19, wherein the focal lengths of said second and third lens units are f2 and f3, respectively, following condition is satisfied:

$$0.8 < |f3/f2| < 1.4.$$

21. A magnification changing lens according to claim 20, wherein when the focal length of said last lens unit is f4 and the focal length of the entire system at the wide angle end is fw, following condition is satisfied:

$$1.5 < f4/fw < 7.0.$$

22. A magnification changing lens according to claim 17, wherein said last lens unit has a negative refractive power.

23. A magnification changing lens according to claim 22, wherein said last lens unit always has a magnification of one-to-one or higher.

24. A magnification changing lens according to claim 23, wherein when an amount of movement of said third lens unit and said last lens unit during the magnification change from the wide angle end to the telephoto end are M3 and M4, respectively, following condition is satisfied:

$$0 \leq M4/M3 < 3.$$

25. A magnification changing lens according to claim 24, wherein said last lens unit has at least one negative lens having its concave surface facing the object side.

26. A magnification changing lens according to claim 25, wherein when the focal lengths of said third lens unit and said last lens unit are f3 and f4, respectively, following condition is satisfied:

$$0.05 < |f3/f4| < 0.9.$$

27. A magnification changing lens according to claim 17, wherein during the magnification change from the wide angle end to the telephoto end, each lens unit is moved so that lateral magnifications of said second, third and last lens units may always increase.

28. A magnification changing lens according to claim 27, wherein when the amount of variation in the focal length of the entire system resulting from the magnification change from the wide angle end to the telephoto end is $\Delta f$ and the amounts of movement of said second lens unit and said last lens unit are M2 and M4, respectively, following conditions are satisfied:

$$0.3 < |M2/\Delta f| < 0.6$$

$$0.15 < |M4/\Delta f| < 0.6.$$

* * * * *

UNITED STATES PATENT AND TRADEMARK OFFICE
CERTIFICATE OF CORRECTION

PATENT NO. : 5,078,481
DATED : January 7, 1992
INVENTOR(S) : HIROKI NAKAYAMA, ET AL.

It is certified that error appears in the above-identified patent and that said Letters Patent is hereby corrected as shown below:

Column 2:

Line 1, "have" should read --has--.

Line 66, fill to right margin.

Line 67, fill to right margin.

Column 3:

Line 30, "and" should read --are--.

Line 49, "$\emptyset = \emptyset_{123} + \emptyset_4 - e\emptyset_{123} \cdot {}_{45} \ldots \quad (2)$" should read --$\emptyset = \emptyset_{123} + \emptyset_4 - e\emptyset_{123} \cdot \emptyset_{45} \ldots \quad (2)$--.

Column 4:

Line 9, "easily" should read --more easily-- and "threeunit" should read --three-unit--.

Column 12:

Line 28, "$\Delta A$" should read --$\emptyset A$--.

Line 38, "unit," should read --units,--.

Column 13:

Line 61, "is" should read --its--.

UNITED STATES PATENT AND TRADEMARK OFFICE
CERTIFICATE OF CORRECTION

PATENT NO. : 5,078,481

DATED : January 7, 1992

INVENTOR(S) : HIROKI NAKAYAMA, ET AL.

It is certified that error appears in the above-identified patent and that said Letters Patent is hereby corrected as shown below:

Column 14:

Line 17, "mangification" should read --magnification--.

Line 35, "meniscusshaped" should read --meniscus-shaped--.

Column 15:

Line 64, "R18 aspherical" should read --R18 aspherical surface--.

Column 16:

Line 54, "whwerein" should read --wherein--.

Line 58, "and" should be deleted.

Line 66, "and" should be deleted.

Column 17:

Line 12, "are" should read --is--, and "following" should read --the following--.

Line 25, "following" should read --the following--.

Line 47, "following" should read --the following--.

Line 65, "following" should read --the following--.

UNITED STATES PATENT AND TRADEMARK OFFICE
CERTIFICATE OF CORRECTION

PATENT NO. : 5,078,481

DATED : January 7, 1992

INVENTOR(S) : HIROKI NAKAYAMA, ET AL.

It is certified that error appears in the above-identified patent and that said Letters Patent is hereby corrected as shown below:

<u>Column 18</u>:

Line 9, "are" should read --is--.

Line 10, "following" should read --the following--.

Line 15, "the" should read --when the--.

Line 16, "following" should read --the following--.

Line 24, "following" should read --the following--.

Line 37, "are" should read --is-- and "following" should read --the following--.

Line 48, "following" should read --the following--.

Line 62, "following" should read --the following--.

Signed and Sealed this

Twenty-ninth Day of June, 1993

Attest:

MICHAEL K. KIRK

Attesting Officer      Acting Commissioner of Patents and Trademarks